US006865522B1

(12) United States Patent
Gastiger et al.

(10) Patent No.: US 6,865,522 B1
(45) Date of Patent: Mar. 8, 2005

(54) PROCESS AND APPARATUS FOR PRODUCING A DIAGRAM OF AN INSTALLATION COMPRISING APPARATUSES SUPPLIED WITH GAS

(75) Inventors: Michel Gastiger, Paris (FR); Gérard Loiseau, Paris (FR)

(73) Assignee: L'Air Liquide Société Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 827 days.

(21) Appl. No.: 09/675,257

(22) Filed: Sep. 29, 2000

(30) Foreign Application Priority Data

Oct. 1, 1999 (FR) .............................................. 9912312

(51) Int. Cl.$^7$ ................................................ G06G 7/48
(52) U.S. Cl. ........................................................ 703/9
(58) Field of Search ........................... 700/266, 28–33, 700/271; 703/2, 9; 422/105, 109; 707/1; 345/420, 708, 336; 228/42; 60/648; 137/113; 73/861; 250/339

(56) References Cited

U.S. PATENT DOCUMENTS

| | | | | |
|---|---|---|---|---|
| 4,380,242 A | * | 4/1983 | Bresie et al. ................ 137/113 |
| 4,905,160 A | | 2/1990 | Maurice et al. .............. 700/271 |
| 5,364,007 A | * | 11/1994 | Jacobs et al. .................. 228/42 |
| 5,698,163 A | | 12/1997 | Mandel ....................... 422/105 |
| 5,808,905 A | * | 9/1998 | Normann et al. ............... 703/2 |
| 5,828,377 A | * | 10/1998 | Muro et al. .................. 345/420 |
| 5,920,069 A | * | 7/1999 | Fischer et al. .......... 250/339.13 |
| 5,950,441 A | | 9/1999 | Mahableshwarkar et al. . 62/171 |
| 6,219,046 B1 | * | 4/2001 | Thomas et al. ............... 345/336 |
| 6,612,186 B1 | * | 9/2003 | Patten et al. ............... 73/861.04 |
| 2001/0003247 A1 | * | 6/2001 | Lundberg ...................... 60/648 |

FOREIGN PATENT DOCUMENTS

EP 0 508 386 A2 10/1992 ........... G06F/15/46

* cited by examiner

Primary Examiner—Kevin J. Teska
Assistant Examiner—Kandasamy Thangavelu
(74) Attorney, Agent, or Firm—Burns, Doane, Swecker & Mathis, L.L.P.

(57) ABSTRACT

The invention relates to a process for producing a diagram of an installation using apparatuses, each apparatus being supplied with gas, comprising:

the consultation of one or more databases (5) comprising, for each apparatus, data on the flow rate, the nature, the purity of the gas supplying the apparatus, and the supply pressure of that gas for that apparatus, the selection, for each apparatus, of a value, or of a limit value, of duration or of frequency of use, the calculation, for each apparatus, of the consumption, or of the limit consumption, according to the utilisation value and to the flow rate data, the calculation, for each gas and for each gas purity, of the total of the consumptions of all of the apparatuses, the indication of technical constraints, the consultation of a database (5) for proposing, for each gas and each gas purity, a packaging, as a function of the consumption and of the technical constraints relating to the storage of the gas and/or to their delivery.

48 Claims, 27 Drawing Sheets

FIG. 10F

Page 5: Summary — 248

Selection — 250
- By Laboratory
- By Analyser

New Lab Button Page 2
- Button to Return to Page 3
- Go to Page 6 for Calculation — 254

Example of Output by Laboratory

LABORATORY: B1/SDC

| Analyser and Technique | Name | Tab Use | GAS | Purity | Flow Unit | Pressure Unit | Working Time (hours) | Bottle Size | Vol. Unit |
|---|---|---|---|---|---|---|---|---|---|
| GC/ECD | Jean | Carrier | $H_2$ | Alphagas 2 | 6 sccm | 3 bar | 1400 | N | N |
|  |  | Cleaning | $H_2$ | Alphagas 2 | 100 sccm | 3 bar | 400 | N | N |
|  |  | Standard | $CF_4/N_2$ |  |  |  |  | B5 | $1m^3$ |
| RMN | Paul | Cold | N? |  |  |  |  | BULK | 5 l/d |

End and Retention of Data — 252

Volume of Empty Cylinder to be Returned | Number — 256

Print Form

FIG. 10R

Page 16

AIR LIQUIDE

Button to Return to Page 3.... — 412

— 410

CLIENT: ........

PRICE

GAS

Code.......
Number of Bottles........
Others..........

EQUIPMENT

Ref.......
Number..........

MIXTURES

Ref.......
Number of Bottles........

Total Price

PROCESS AND APPARATUS FOR PRODUCING A DIAGRAM OF AN INSTALLATION COMPRISING APPARATUSES SUPPLIED WITH GAS

This application claims priority under 35 U.S.C. §§119 and or 365 to 99 12312 filed in France on Oct. 1, 1999; the entire content of which is hereby incorporated by reference.

THE TECHNICAL FIELD OF THE PRIOR ART

The invention relates to the field of the organisation or to the reorganisation (or restructuring) of laboratories or factories or items of equipment making use of analysers or apparatuses supplied with gas, and/or of services requiring a gas supply.

More particularly, the invention relates to a process and a system for producing a diagram of an installation, in such a laboratory or in such a factory, and for determining a suitable choice of a gas supply for such an installation.

In practice, when an employee of a firm (for example a manufacturer or distributor of gas) able to propose such installations, with their supply, goes into a laboratory or a factory, he has, in order to make an offer to his customer or to the managers of the laboratory or of the factory, only the needs expressed by the customer, and the knowledge which he can have regarding the customer's business.

If the customer does not know his requirements perfectly, the firm or its employee will have difficulty in establishing a project suitable for the genuine requirements demanded by the utilisation.

This is normally the case when the laboratory in question is a research laboratory or a test laboratory, which have demanding and various requirements.

This results in a waste of time in the technical finalising of the project, and therefore also in its final production.

If the manager of the factory or of the laboratory knows his requirements well, the manufacturer or supplier of equipment or of gas must be able to optimise his technical project as soon as his representative is present on the site of the factory or of the laboratory.

This manufacturer or this supplier can therefore have prior data on the existing equipment and the gas supplies; but it is preferable to be able to produce as quickly as possible a technical project taking account of the modifications to be made because of new requirements.

Furthermore, it is preferable to be able to integrate or incorporate the new data in the pre-existing data, relating to the equipment and the installations, as quickly as possible.

DESCRIPTION OF THE INVENTION

The purpose of the invention is firstly a process for producing a diagram of an installation using apparatuses, each apparatus being supplied with gas, comprising:
  the consultation of one or more databases, or searching for, in one or more databases, data comprising, for each apparatus of the installation, data on the flow rate, the nature, the purity of the gas supplying the apparatus, and the supply pressure of that gas for that apparatus,
  the selection, for each apparatus, of a value or of a limit value, of duration or frequency of use,
  the calculation, for each apparatus, of the consumption, or of the maximum consumption, according to the utilisation value and to the flow rate data,
  the calculation, for each gas and for each gas purity, of the total of the consumptions of all of the apparatuses,
  the indication of technical constraints relating to the storage gases and/or to their delivery,
  the consultation of a database for choosing, for each gas and each gas purity, a packaging, according to the preceding consumptions and technical constraints.

Advantageously, this process furthermore comprises:
  a step of consulting one or more databases comprising data on gas installation equipment,
  searching, in this database, for the equipment allowing, for each packaging and each apparatus, the connection of the said packaging to the said apparatus.

This process allows, by the consultation of databases, the constitution of a set of data describing an installation with its apparatuses, the gas supply of these apparatuses, and the equipment means for connecting the said supplys to the apparatuses.

Thus, the diagram of the installation can be produced very rapidly, which shortens its design time.

The consultation of databases can be done remotely, by electronic or computer means.

The installation diagram can therefore be produced at the very place where the said installation must be carried out.

Preferably, there is also produced a graphic representation of the installation comprising the apparatuses, and their means of gas supply.

This representation is advantageously three-dimensional, which makes it possible to display the relative disposition of the various gas supply pipes and ductings.

According to another aspect of the invention, a gas installation is defined, this installation comprising at least one particular type of packaging for a gas, and an apparatus or a requirement supplied by this gas, by the utilisation of:
  fixed databases, which contain for each apparatus basic data on the flow rate, the nature, the purity of the gas supplying the apparatus and the supply pressure of this gas for that apparatus,
  one or more dynamic databases, created by the entry of data and/or calculation results.

Consequently, according to another aspect, the invention relates to a process for producing a set of data for the constitution of an installation using apparatuses, each apparatus being supplied with gas, comprising the production of a dynamic database containing:
  for each apparatus, the data on the nature and the purity of the gases for that apparatus, together with the flow rate, the supply pressure and the consumption of each gas for that apparatus, by consultation of at least one fixed database,
  the total of the consumptions of all the apparatuses, for each gas and each gas purity,
  a packaging, for each gas and each gas purity, as a function of the consumptions of the apparatuses, here again by consultation of at least one fixed database.

The constitution of the installation diagram, such as already defined above, or the establishment of the set of data such as has just been defined, determines an installation whilst associating a gas packaging with each apparatus.

This determination is furthermore carried out very quickly, as already explained above, which shortens the design time of the installation.

When one of the gases is a mixture of a balance gas and at least a first component, the process according to the invention can furthermore comprise:
  the selection of the desired quantitative composition of the component in the mixture,
  the consultation of a database comprising, for each mixture, the preparation tolerances and the corresponding analysis precisions, the indication or display, for the desired quantitative composition, of the preparation tolerance and of the analysis precision.

Furthermore, when several quantitative compositions are selected for a mixture, it is possible to display a regression line, obtained with these quantitative compositions, for a given apparatus.

The invention also relates to a process for producing an installation using apparatuses, each apparatus being supplied with gas, comprising:
- the production of a diagram of the installation, using a process such as described above,
- the physical production of the installation.

The invention also relates to a device for producing a diagram of an installation using apparatuses, each apparatus being supplied with gases, comprising:
- means of storing:
  - at least one database comprising, for each apparatus, data on the flow rate, the nature and the purity of the gas supplying the apparatus, and the supply pressure of that gas for that apparatus,
  - a database comprising, for each gas and each gas purity, at least one possible packaging,
    - means for selecting, for each apparatus, a value or a limit value of duration or of frequency of use,
    - means for calculating, for each apparatus, the consumption, or the maximum consumption, according to the data on the flow rate and the utilisation value,
    - means for calculating, for each gas and for each gas purity, the total of the consumptions for all the apparatuses,
    - means for indicating the technical constraints relating to the storage of the gas and/or to their delivery,
    - means for consulting the packaging database in order to find in it, according to gas consumption data and technical constraints relating to the storage of the gas and/or to their delivery, a possible packaging.

The invention also relates to a terminal device four producing a diagram of a gas installation, for a laboratory or a factory comprising at least one apparatus, each apparatus being supplied with gas, this device comprising:
- means of communication for establishing communication between the said terminal device and means containing at least one database comprising, for each apparatus, data on the flow rate, the nature and the purity of the gas supplying the apparatus, and the supply pressure of that gas for that apparatus, and for transferring data from the said set of databases to the said terminal,
- means for supplying the said terminal with user data for the said terminal, comprising at least one item of data on a used apparatus or identifying a used apparatus,
- means of storage, in communication with the means for supplying the said terminal with user data, for storing these user data on an apparatus used by the user, together with data supplied by the database on the flow rate, the nature and the purity of the gas supplying that apparatus, and the supply pressure of that gas for that apparatus,
- means for calculating, or specially programmed for calculating, for each apparatus, the consumption or the maximum consumption, according to the flow rate of the gas, and for calculating, for each gas, and for each gas purity, the total of the consumptions of all of the apparatuses used,
- means of display, in communication with the means of storage, for displaying at a least a portion of these data supplied by the database, and/or the total or totals of consumption calculated for each gas.

In both cases, such a device constitutes a very effective tool in the production of a technical and/or commercial proposal, during the carrying out of an organisation or reorganisation of a laboratory or of equipment using analysers or apparatuses supplied with gas.

Such a proposal can be produced much quicker than with the conventional methods.

Furthermore, means can be provided to represent graphically the installation comprising the said apparatuses and their gas supply means.

The means of storage of databases are localised in a central computer.

BRIEF DESCRIPTION OF THE FIGURES

The characteristics and advantages of the invention will become more apparent in the light of the following description. This description relates to examplary embodiments, given by way of non-limitative example, with reference to the accompanying drawings in which.

DETAILED DESCRIPTION OF EMBODIMENTS OF THE INVENTION

In the whole of the following description, the word "customer" will denote the person who manages or who is responsible for the laboratory or the factory where the apparatuses are installed, or where the services supplied with gas are located. A list is drawn up of all the apparatuses available to him or of the services which he must use and which are supplied with gas.

Furthermore, the word "user" will denote either the customer himself or a representative of a company which manufactures or distributes gas and/or the corresponding equipment.

Figure 1:
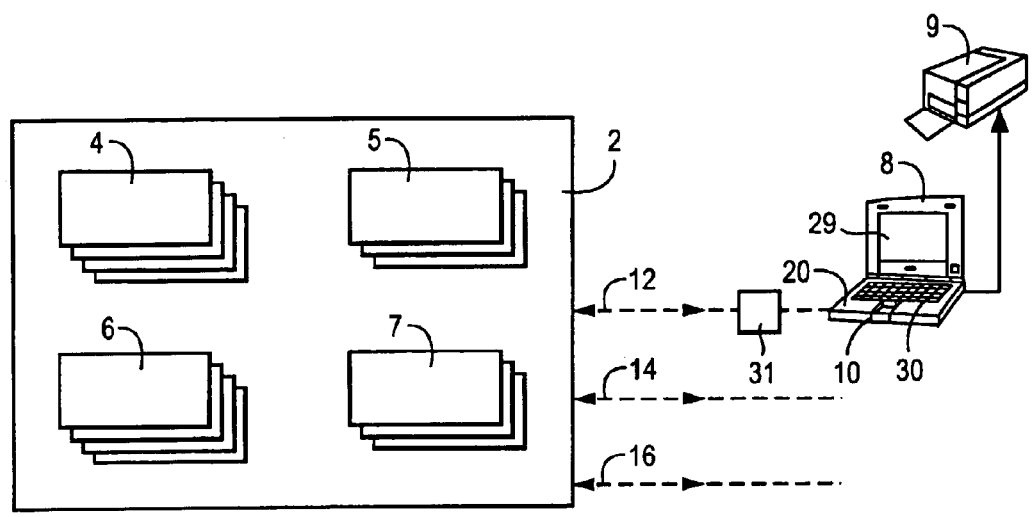
FIG. 1 is a diagrammatic view of a system for implementing the invention.

An examplary embodiment of a system allowing the use of the invention will now be described with reference to FIG. 1.

In this Figure, the reference 2 denotes either a central computer or a website. In the second case, this site is preferably accessible only through an intranet system.

In both cases, databases 4, 5, 6, 7 are housed in the computer or at the site. Such databases can be updated and respectively relate, for example, to:

- a database 4 in which are listed the customers of a company which manufactures or distributes gas,
- a database 5 grouping the physical characteristics of gas and, possibly, technical data about the gas, specific to the gas manufacturer, supplier or distributor,
- a database 6 relating to various analysers or apparatuses used, each of which requiring a gas supply,
- and a database 7 relating to the hardware, or equipment, for example, pressure reducers and/or valves, . . . , which can be used in combination with the analysers of the database 6 and the gases of the database 5.

Various users can be connected to the means 2 of housing these databases. In FIG. 1, one of these users is represented by his portable or PC-type computer 8, the connection with the means 2 being provided by a communications system 12, for example an intranet system 12 and by means of connecting this system (modem or network card 31).

At the same time, other users, not shown in the figure, can be connected to the housing means 2, by communications means 14, 16, . . . , which can be part of a system: each user's computer is also connected to it by a modem or a network card.

According to a variant, the databases, 4, 5, 6, 7 can also be stored in the storage means of the computer device 8, insofar as the size of these databases and the memory capacity available in this computer system 8 are compatible.

The computer system 8 can for example be a commercial PC-type microcomputer.

Figure 2:
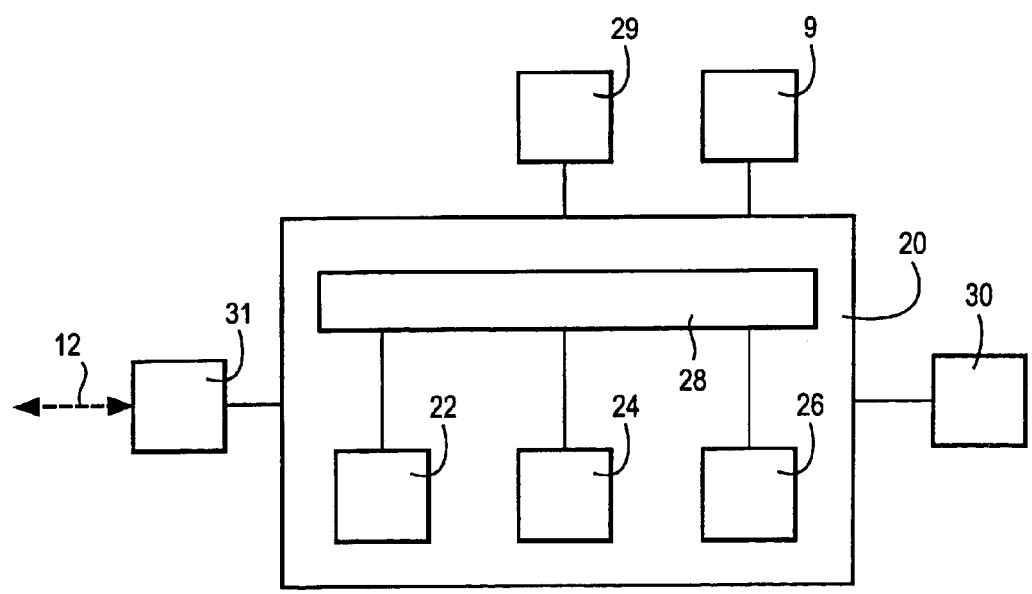
FIG. 2 is a block diagram of the internal structure of the computer means used in the context of the present invention.

It comprises (FIG. 2) a central unit 20 which itself comprises a microprocessor 22, a set 24 of ROM and RAM memories, a hard disk 26, which also has an information storage function, all of these elements being coupled to a bus 28.

A screen 29 makes it possible to display information on the data entered into the system by an operator, and the data supplied by the databases in response to data entered by the operator. Examples of presentation pages, displayed during the execution of the process according to the invention, shall be given below.

The system also has control peripherals and, in particular, a keyboard 30 and a mouse 10. Other means of selecting a zone or a field of a page displayed on the screen 29 can also be used, for example any means making it possible to make a selection by tactile contact on the screen.

The instructions for using a process according to the invention are stored in the means 24, 26 of storage of the computer system 8. The corresponding programs can also be resident in a website 2 to which a user connects via the terminal 8, the means 31 and the network 12.

According to another embodiment, all or part of the information contained in the databases 4, 5, 6, 7 is contained in the RAM memory of the computer system 8 and/or on the hard disk 26.

The database 4, or customer database, essentially relates to the general information on the purchasers of gas who are already listed by the gas manufacturer or supplier.

The database 4 can also contain information on the site or factory or installation of a particular customer, together with the prices previously applied to that customer.

The database 5 essentially contains, for each gas manufactured or supplied by the gas manufacturer or supplier, the nature of that gas, its grade or its purity, the packaging or packagings in which it is available and, possibly, the information relating to the code of each item, such as defined by the preceding data, and/or its price, and/or its physical or thermodynamic properties.

In this database on the gases, it is also possible to find information on the gas mixtures which the manufacturer or supplier is capable of offering.

Each gas mixture is defined by its composition which is formed from a balance gas and one or more gas added to or mixed with this balance gas. The database can then, for example, offer, for each balance gas, the list of available gases which are mixed with this balance gas and, for each of these gases, the list of available concentrations.

It can also contain information on the preparation tolerances of mixtures and the uncertainties of analysis of these mixtures.

The database 6 relates to the analysers or the apparatuses which can be encountered in an installation or in a factory. In other words, it contains the list of apparatuses which need gas for them to operate, and/or for their standardisation and/or their calibration. In relation to each analyser, the values of gas flow rate, the type or types of gas (nature and purity), and of supply pressure required per analyser or per apparatus are given.

Examples of analysers which can be encountered in an installation or in a factory or in a laboratory can be as follows: thermal analysers, X-ray fluorescence analysers, mass spectrometers, plasma emission spectrometers, infrared absorption spectrometers and gas phase chromatographs. This list is in no way limitative, and any other type of analyser can be encountered in a given laboratory or factory and can be referenced in the database 6.

Services can also be referenced in this database. These can be, for example, the production of coldness or the production of a certain atmosphere.

This database can be enriched with information on new analysers, apparatuses or services.

The database 7 on the equipment contains the descriptions and references of the equipment proposed by, the installer or by the gas supplier. It can also contain information such as the price of the various items of equipment.

In response to the user's instructions, a connection is established between the system 8 and the means 2 which house the databases and, possibly, the programs to be used for executing the process.

An interactive session can then be initiated, during which, in response to data entered by the user, the system 2 will send, to that user, data selected by searching in the databases 4, 5, 6, 7.

Using the computer system 8, a first analyser or apparatus is selected. The information specific to that analyser, and relating to the nature, the purity and the necessary flow rate of the gas, and to the supply pressure of the analyser or apparatus, are searched for in the database 6 and sent to the computer system 8 and stored in the storage means 24, 26. This information can be displayed on the screen 28. It can also be validated and corrected.

Furthermore, the operating time of the apparatus is entered according to the data supplied by the customer and it is possible to derive from this the gas consumption of the apparatus, for each gas.

This step is repeated as many times as necessary, that is to say as many times as there are apparatuses listed by the customer.

All the data thus collected are retained in the memories 24, 26 of the computer system 8. It can also be sent to the central computer 2.

If there are gas requirements, other than those for supplying analysers, for example for generating certain atmospheres, or for obtaining certain low temperatures, the same data are entered into the system 8, for example by hand using the keyboard 30 and without recourse to a particular database. These data are also stored in the memories 24, 26 of the system 8, or sent to the system 2.

A summary table of the expressed requirements can be displayed on the screen 28. It is then possible to correct the entered data and/or to group them zone by zone, or laboratory by laboratory.

The system 8 (or the means 2) incorporate calculation software which will make it possible, for each point of use, and therefore for each requirement or each apparatus, to calculate the unit consumption or consumptions of gas.

The total of the consumptions, calculated gas by gas and purity by purity, is retained in memory 24, 26. Furthermore, the data corresponding to the highest supply pressure (amongst all of the apparatuses), and to the highest supply flow rate, can also be stored in memory.

More precisely, the demanded volume (working time× flow rate) is calculated per requirement or per apparatus, gas and grade. The working time is perhaps, for example, expressed monthly or quarterly or annually. These results are stored.

All of these results, for each gas and for each grade or purity, are totalled and stored, and this is done for each laboratory or set of laboratories.

For example, the following result is obtained:

Nitrogen/purity=$\frac{1}{30}$m$^3$ per month/$p_{max}$=5 bar/flow$_{max}$=1 liter per hour/analysers: X, Y and Z/laboratory 1.

For each gas, the total consumption is then compared with the gas manufacturer's or supplier's offer (by consulting and searching the database 5) in order to respond to the corresponding needs, the criterion selected being the packaging of the gas (bottle, or container, or bulk).

In order to make this choice, it is also possible to take into account, on the one hand, the manufacturer's or supplier's constraints (accessibility of the site where the delivery must be made and/or the time between two successive deliveries, . . . ) and/or the possible constraints of the customer or of the laboratory to which the delivery must be made (space available for installing the gas containers and/or for the storage of containers indoors or outdoors and/or the presence of personnel able to handle the containers). All of these constraints can result in modifying an initial choice of packaging. A final choice is stored and can, for example, also be integrated in the customer database 4.

As will be explained below, the constraints relating to mixtures are not necessarily of the same type as those relating to pure gas.

Once a choice of packaging has been made, it is possible to propose a standard installation diagram, adapted to each gas, to each purity, and for the maximum flow rate and the maximum working pressure required by all of the analysers and for a given quality of analysis. Thus, for each packaging, it is possible to propose an item of equipment or a set of equipment (valves and/or regulators and/or filters, . . . ) necessary for the functioning of the analyser or of the apparatus, with the previously chosen and selected packagings. The database 7 on the available equipment can be consulted for this purpose.

The choice of equipment can be carried out in two stages.

A first stage relates to the equipment for the high-pressure section, associated with the packaging. A diagram can for example be displayed which shows the details of the storage and the equipment necessary for the functioning of the latter (pressure reducers and/or valves, . . . ). The customer then chooses all or part of the necessary equipment. The offered equipment is chosen in relation to the gas data (type, purity, flow rate, . . . ).

A second stage relates to the equipment for the low-pressure section, associated with the point of use. A diagram can for example be displayed which shows the details of the connections to be made between the outlet of the gas storage and the utilisation. The customer then chooses all or part of the necessary equipment. The offered equipment is chosen in relation to the gas data (type, purity, flow rate, . . . ).

Information concerning the geometric parameters of the place where the installation must be made can also be input. These geometric data condition the lengths of gas lines or ductings between each gas source and each point of use.

All of these results, obtained for a laboratory or for a factory, can be extended to a building or to a complete site by simple juxtaposition of the solutions found for each building or individual site.

It is possible to produce a diagram of a gas installation as it is integrated in the laboratory or the factory, for example by a three-dimensional representation of the rooms and/or the buildings.

Figure 3:
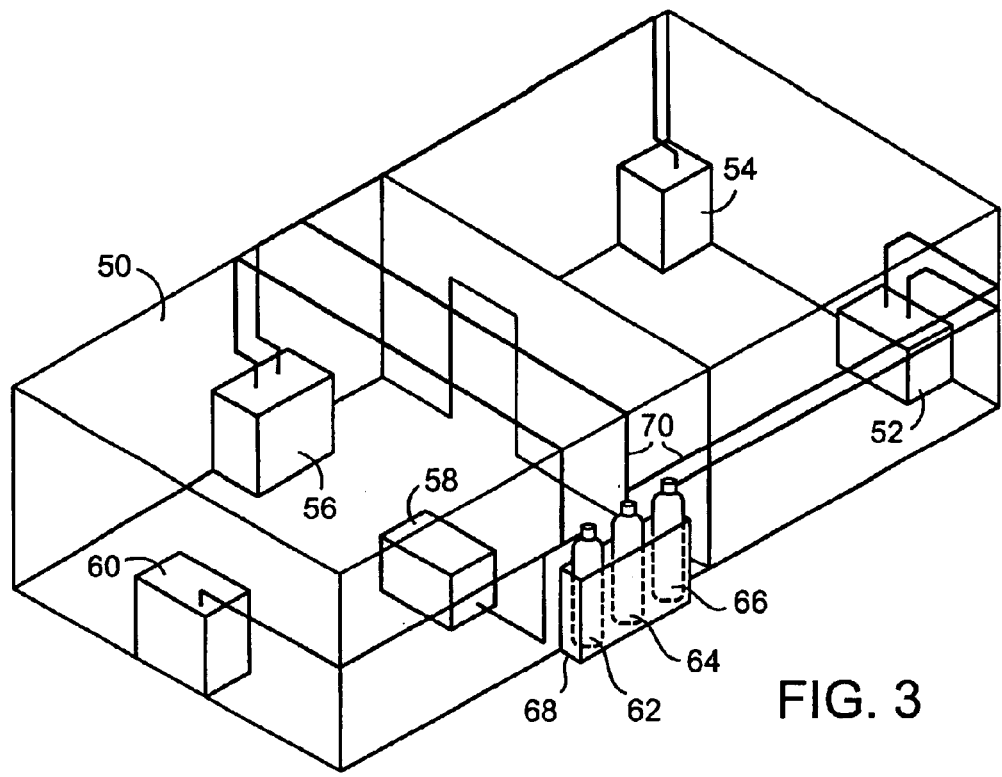
FIG. 3 is a three-dimensional representation of an installation obtained with the help of the process according to the invention.

Such a representation is given in FIG. 3. In this figure, a building 50 of a laboratory or of a factory comprises several apparatuses 52, 54, 56, 58, 60, which are supplied with various gas cylinders 62, 64, 66 disposed in a container 68. A set of ductings 70 connects the different bottles to the different analysers, according to the needs of the latter. For example, in FIG. 3, the bottle 62 supplies the analysers 56, 58 and 60, bottle 64 supplies the analysers 52, 54, 56 and bottle 66 supplies the analyser 52.

In this latter type of representation, the analysers and the apparatuses of the laboratory are represented, for example by cubes, such as they really appear in the laboratory, with the connections to the various gas sources.

Similarly, the gas sources are represented at the place where they must be placed in reality. All of the ductings therefore constitute an assembly such as can be installed in reality.

The same representation can be made for an installation incorporating other applications (glove box, room with controlled atmosphere, . . . ) to which ductings carry gas from one or more sources.

Figure 4:
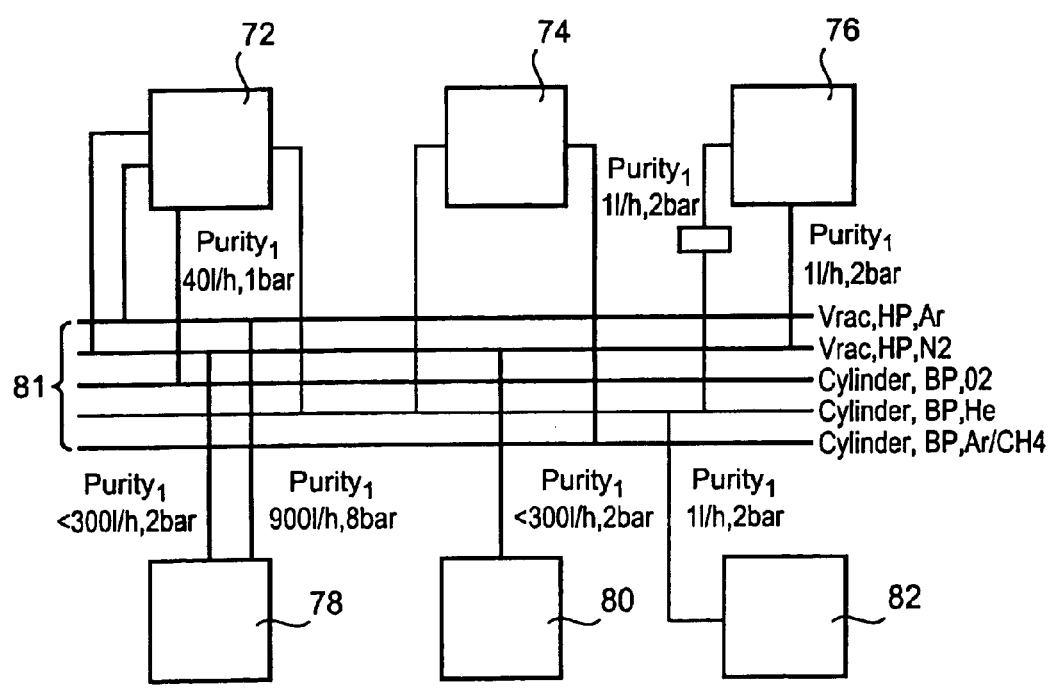
FIG. 4 is a more detailed representation of a part of an installation obtained using a process according to the invention.

Another, more detailed possibility of representation is illustrated in FIG. 4. The various apparatuses 72, 74, 76, 78, 80, 82 of a same laboratory are represented diagrammatically with their connections to the various gas supplies and to the various ductings 81 which are, in this type of representation, disposed linearly and parallel with one another. Each of these ductings is connected to one or more individual gas sources, indicated in the figure. For each gas there are specified the packaging method (cylinder=bottle), the pressure (high=H, low=B) and the nature of the gas. Furthermore, for one or more of the analysers shown, it is possible to indicate, for example, the necessary purity and/or flow rate and/or pressure.

In the process described above, it is also possible to deal with the aspect relating to the equipment to be used to connect the selected gas, together with their packaging, to the various analysers.

Figure 5:
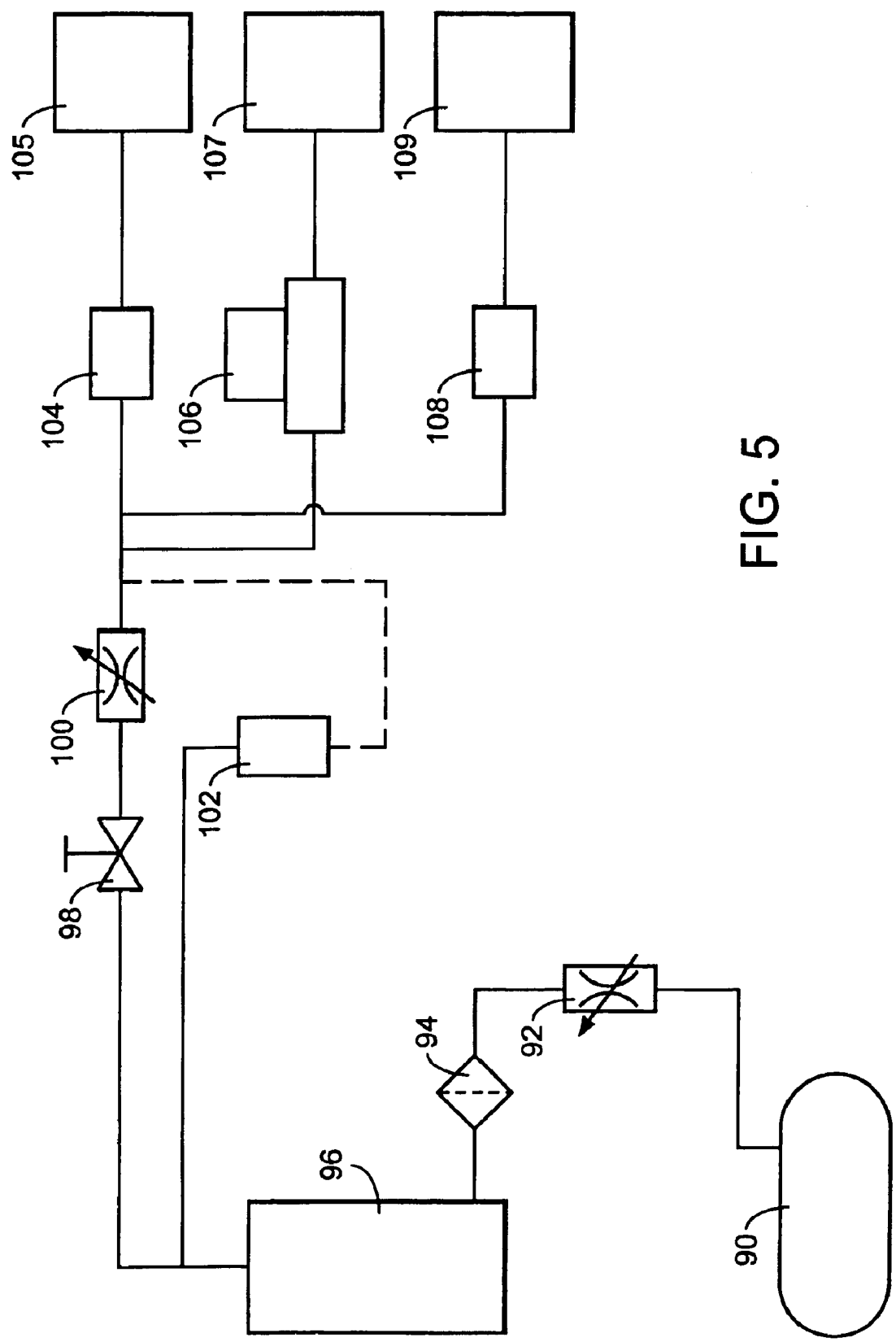
FIG. 5 is another type of detailed representation of an installation obtained using a process according to the invention, FIGS. 6, 7A and 7B each show a theoretical regression line and one or two regression lines obtained from measurements with an apparatus.

A type of representation which it is then possible to produce is given in FIG. 5.

In this figure, the reference 90 denotes an air compressor (the gas source), connected to a low-pressure regulator 92, disposed upstream of a filter 94. The air which passes through the latter then enters a nitrogen generator 96, which is itself connected to a valve 98, located upstream of a low-pressure regulator 100. The output of the generator 96 can be optionally connected to a pressure regulator/valve assembly 102. The references 104 and 108 each denote a regulating valve and the reference 106 denotes a mass flow-meter. These latter elements are each connected to an analyser orto an apparatus 105, 107, 109.

In order to produce the representations described above, a program, operating like CAD software, can be loaded or stored in the system 8. After having selected and entered the corresponding data on the dimensions of the laboratory or of the factory, and after having drawn that laboratory or that factory on the screen, the various elements can be searched for in a memory which contains a library, and assembled in order to create a gas distribution system. For a representation of the type shown in FIG. 3, this software can also calculate, for each apparatus and each source, the optimum path of the ducting, for example the one for which the length of ducting is minimum.

The information for having such a CAD program executed are stored in the memory 24, 26 of the system 8.

The different forms of supply (number of bottles, number of generators, . . . ) and the different equipment chosen can be edited in the form of an offer, with a price for each product. This offer can be printed on a paper medium, using a printer 9 connected to the system 8. The prices used can be those contained in the database 5 on the gas, or prices applied specially for the consulted customer and stored in the customers database 4.

More precisely, in order to make a representation of the installation in the laboratory or laboratories, it is possible to proceed according to the following steps.

Firstly, the plan is drawn, to scale, of the room or rooms which will use the same gas sources, in two dimensions or in three dimensions; in this latter case, the representation of the rooms is preferably a line representation as illustrated in FIG. 3.

Then, the software accesses basic data on gas requirements for each apparatus. These data are stored in a temporary and evolving database (on ROM). Each apparatus can then be represented by a cube.

By an operation of the "click and drag" type, on the screen 29 using the means 10, the apparatuses or the cubes are placed one by one in the place where they are found in reality in the rooms or in the laboratories.

The chosen packagings, for the different gas, in the desired purity, are placed on the representation, according to the technical necessities.

Then, the packagings can be connected manually (by inserting pipe layouts, for example by moving a cursor on the screen 29 using the mouse 10) to the apparatuses needing the gas contained in each packaging, and by optimising the path taken by the pipes.

According to a variant, it is the software itself which joins the packagings to the apparatuses needing the gas contained in the packaging, according to previously established criteria (for example: shortest path, or following the walls and/or positioning on the ceiling). The physical inconsistencies can possibly be corrected by hand, for example using a movement of the cursor with the mouse 10; it is also possible to modify the path for reasons of safety concerning the location of the ductings.

Then, the various items of equipment, necessary for the use of the gas, are added to the diagram.

In this way, it is therefore possible to obtain an installation diagram, possibly dimensioned.

This diagram can be printed, in a global version (FIG. 3), or in a detailed version (as in FIG. 4) or in an even more accurate version (as in FIG. 5).

Such a diagram can for example be used for estimating the costs of the installation and/or can be used as an installation plan for the installer responsible for its production.

Another step, which can for example take place on the basis of the representation of FIG. 3, is the actual production of the installation, by physically connecting the supply sources 62-68, with ductings 70, to the various analysers 52-60.

More generally, the information sent by the system 2 after searching in the databases 4-7, the calculated consumption data and the constraint data, form a temporary and evolving, or dynamic, database. From the fixed databases 4-7, the user constitutes such a dynamic database which will allow him to estimate a cost or to produce a plan of an installation to be produced.

The device and the process according to the invention also constitute a selection aid, in cases where gas mixtures must be chosen.

A gas mixture comprises, on the one hand, a balance gas and, on the other hand, one or more gases added to the balance gas. Each of these added gases is present in the balance gas in a certain concentration.

However, a manufacturer or a supplier of gas mixtures does not necessarily deliver all of the possible concentrations for a given mixture.

In other words, the requirements of a customer or of a user can be different from the capability of a manufacturer or supplier to produce or supply gas mixtures.

For example, a customer or a user may need a mixture at 100 ppm, whereas the manufacturer or supplier can guarantee only a concentration of between 90 and 110 ppm. There is therefore, with respect to the concentration desired by the customer or the user, a tolerance due to the mixture production techniques.

Furthermore, once a mixture is produced, the measurement of its concentration is made only with uncertainty, called the analysis uncertainty.

If the user needs several mixtures, in various concentrations, for example in order to calibrate an apparatus, the result of the calibration will depend on the analysis uncertainties of the various mixtures chosen.

Figure 6:
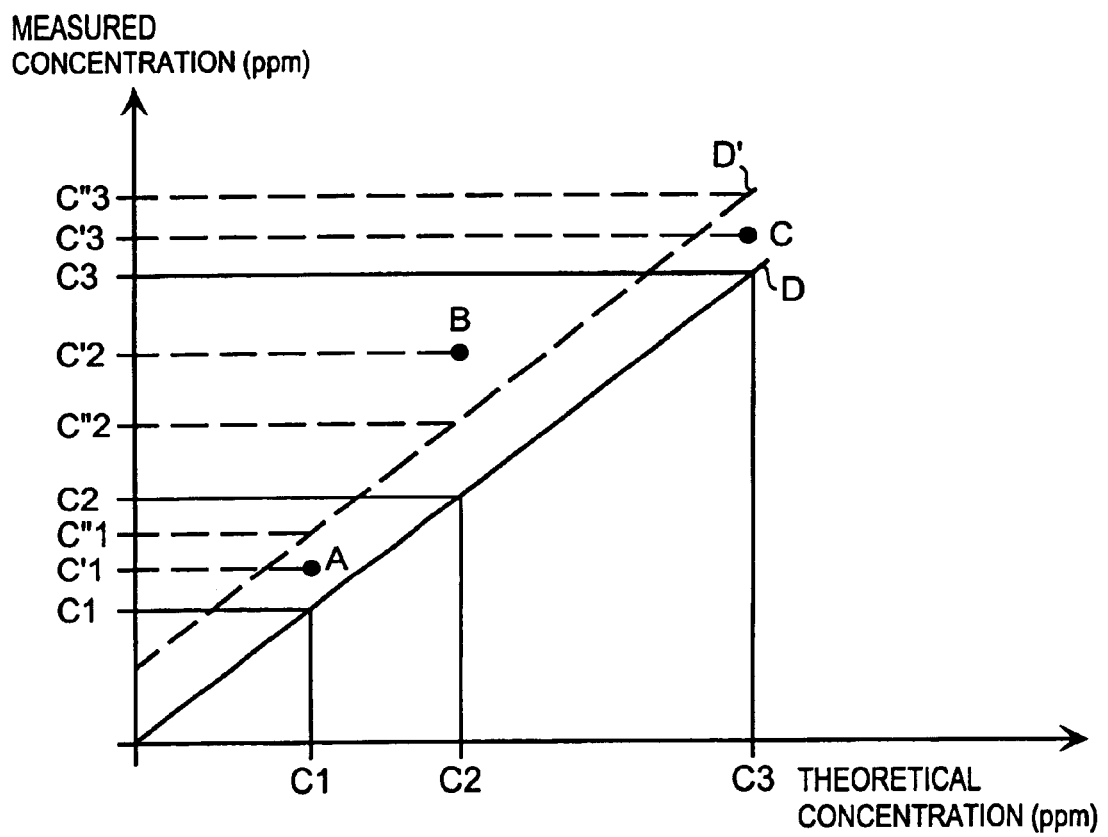

FIG. 6 shows, for an analyser which it is desired to calibrate with three mixtures of a balance gas "X" and a gas "Y" and which is available in three different concentrations, $C_1$, $C_2$, $C_3$, the theoretical straight calibration line D, having a slope equal to one, and the three points A, B, C respectively having the co-ordinates (C1, C'1), (C2, C'2), (C3, C'3). The concentrations C'1, C'2, C'3 represent, respectively, the concentrations actually measured, and the offset of the points A, B and C with respect to the theoretical straight line D is related to the analysis uncertainty.

The straight line D', in dashed line, represents the regression line obtained from the measurement points A, B, C. It is the straight line which will be used, in practice, as the calibration line for the apparatus or the analyser. Now, starting with the co-ordinates $C_1$, $C_2$, $C_3$, this straight line does not give the concentrations C'1, C'2, or C'3, but the concentrations C"1, C"2, C"3.

In other words, the differences, with respect to the theoretical calibration straight line D, are not uniquely due to the measurement uncertainty, but also to statistics: in practice, the further away points B and C are from the theoretical straight line D, the further the away the regression line D' will be from the point A and the straight line D. Now, the positions of the points B and C are uniquely determined by the measurement uncertainty at C2 and C3.

Consequently, if the measurement uncertainty at B and C is reduced, the straight line D' comes closer to the point A and to the straight line D.

The result of this is that the choice of a set of concentrations, for the purpose of carrying out a calibration, can be determined by the graphical representation of the regression line D', or the "maximum" and "minimum" regression lines with respect to the theoretical straight line D.

The user, who will be able to display successively the regression lines obtained with different combinations of mixtures will be able to make the choice which seems most appropriate to him for his requirements. After having displayed a first regression line, which will be, depending on its criteria, located too far from the theoretical straight line D, he will be able to choose another set of concentrations, and therefore another analysis uncertainty set, which will make it possible to bring the regression line D' towards the straight line D.

According to an example, Table I below gives, in its first column, the possible concentrations Ci. The second column gives the corresponding measurement uncertainty and the last two columns give the minimum and maximum concentrations obtained for the uncertainty in the second column.

TABLE I

| Ci (ppm) | Uncertainty (%) | Min. Conc. (ppm) | Max. Conc. (ppm) |
| --- | --- | --- | --- |
| 85 | 10 | 93.5 | 76.5 |
| 250 | 7 | 267.5 | 232.5 |
| 500 | 9 | 545 | 455 |
| 750 | 6 | 795 | 705 |

Table II gives, for each concentration Ci, the values of the minimum and maximum concentrations C"i (in the first and third columns respectively) obtained by the extreme regression lines, and the variations that these values C"i exhibit with respect to the value Ci.

TABLE II

| Min. Conc. C" I (ppm) | Ci (ppm) | Max. Conc. C" I (ppm) | Max Variations | |
| --- | --- | --- | --- | --- |
| 75.6 | 85 | 96.0 | −11% | 13% |
| 231.1 | 250 | 271.5 | −8% | 9% |
| 466.7 | 500 | 537.5 | −7% | 7% |
| 702.3 | 750 | 803.4 | −6% | 7% |

Figure 7A:
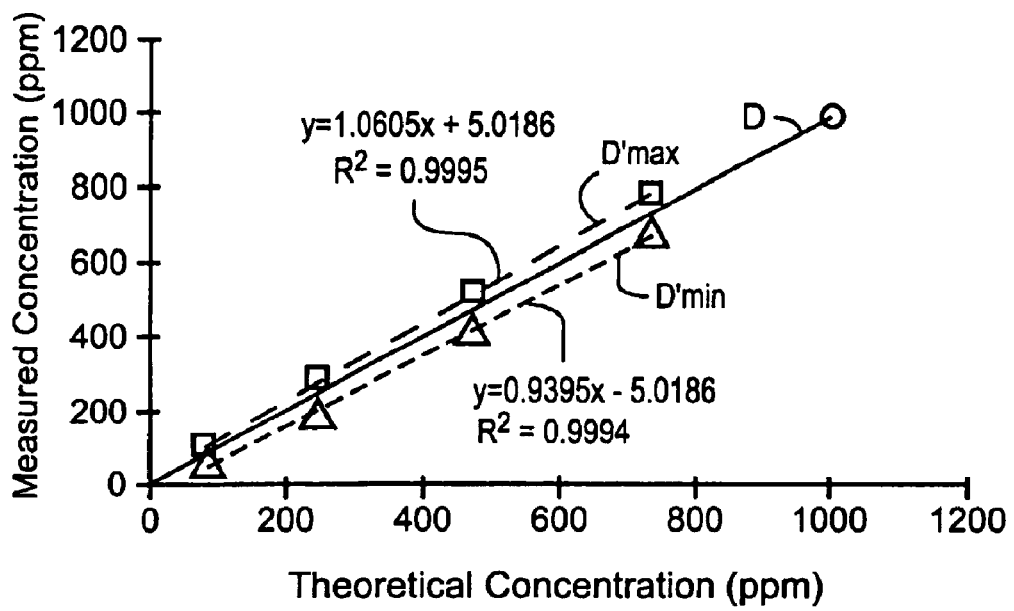

FIG. 7A shows the theoretical straight line D and the regression lines D'$_{min}$ and D'$_{max}$, whose regression equations and coefficients are indicated.

Figure 7B:
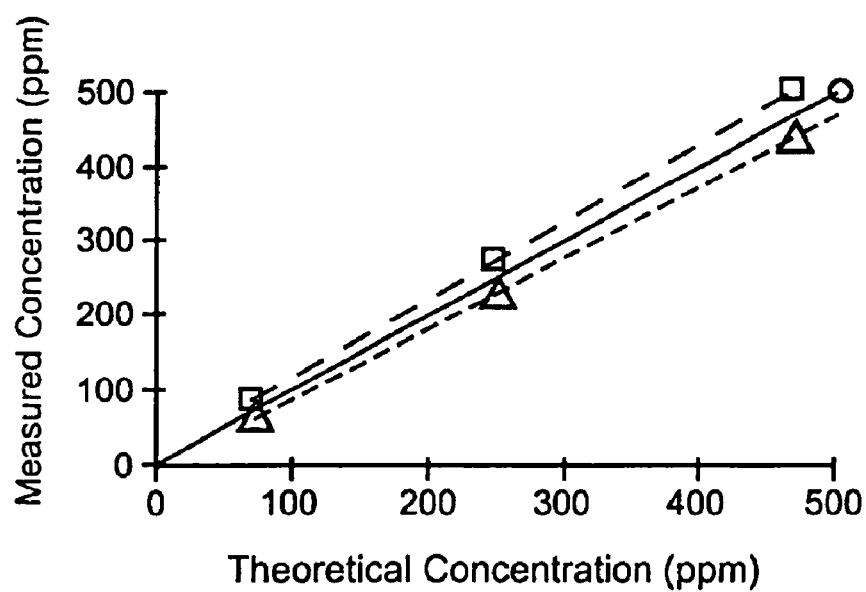

FIG. 7B shows the same straight lines, at a different scale.

The user who displays the graphs of FIGS. 7A and 7B and for whom the choice of the 4 concentrations Ci of Table I above lead to too great a deviation of the regression lines with respect to the theoretical straight line D, can choose another set of concentrations Ci, display another set of regression, lines and thus refine his choice.

For this purpose, the computer means 8 or 2 are provided or specially programmed for carrying out a regression calculation for a certain number concentrations chosen by the user, and for displaying the corresponding straight lines as shown in FIGS. 7A and 7B.

Figure 8A:
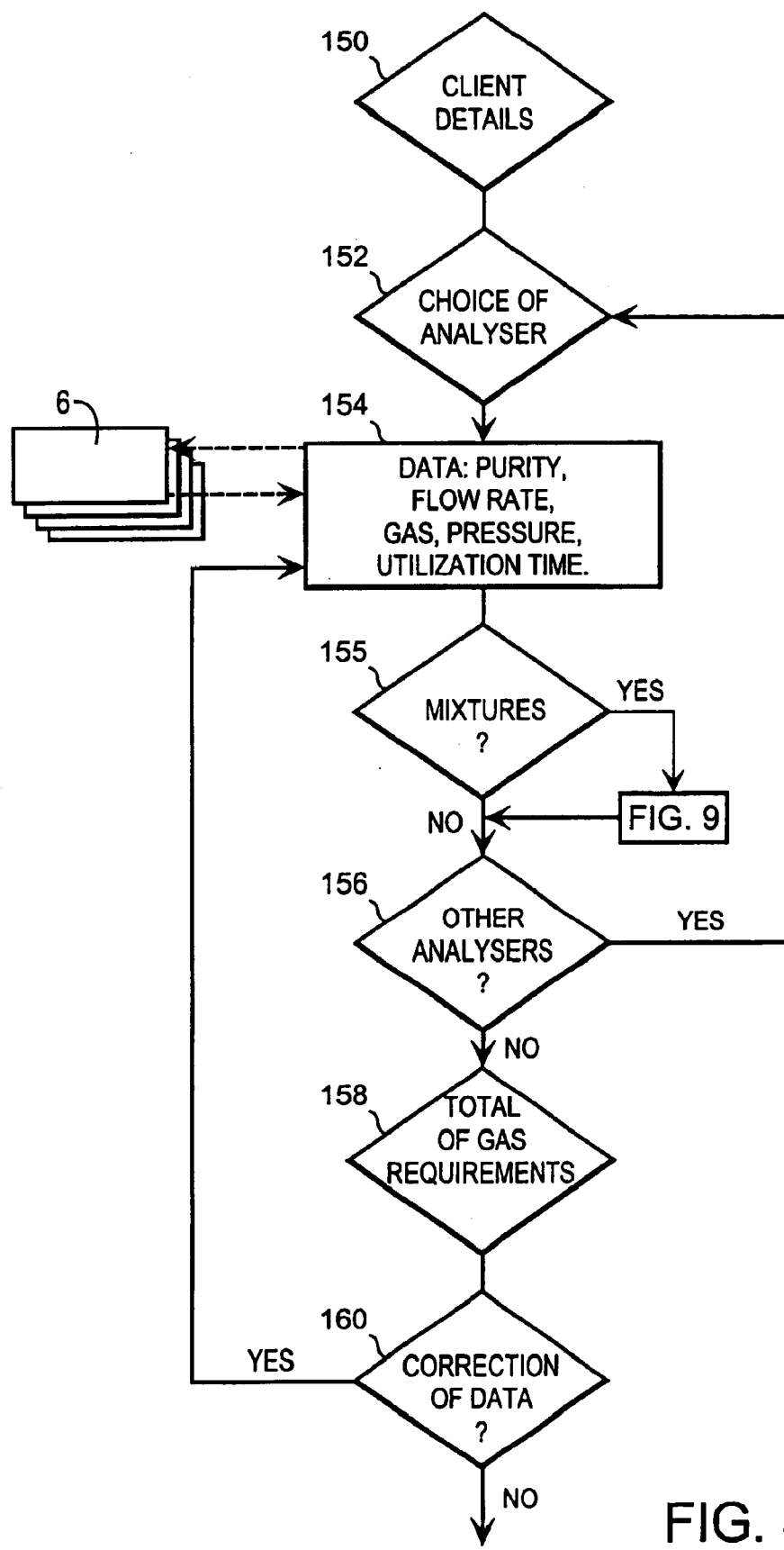
FIG. 8 is a flowchart of a process according to the invention.
Figure 8B:
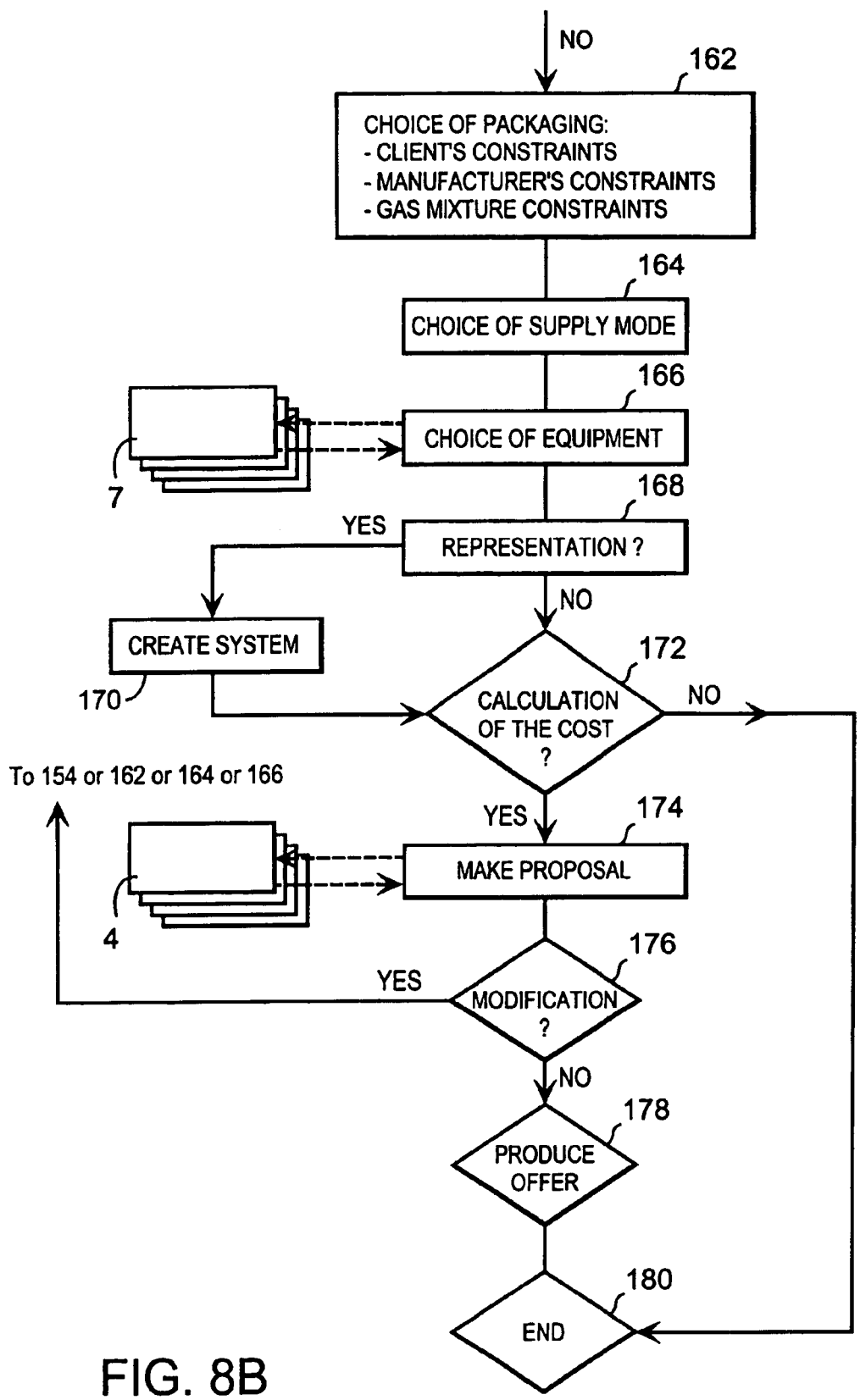

FIG. 8 shows a flowchart of a process according to the invention.

In a first step 150, the data on the customer are entered.

Then (step 152), the choice of a first analyser is made. The database 6, which relates to the analysers, is consulted and the data relating to the nature of the supply gas or gas, their purity, the supply flow rate or flow rates and supply pressure or pressures necessary are stored in the storage means of the system 8 and can be sent to the system 2 by the means 12, 31. Furthermore, the operator or user can himself enter the data relating to the time of use, on the basis of which the consumption can be calculated immediately.

If the foreseen utilisation necessitates gas mixtures (step 155), a special process is used whose flowchart, the of which will be described below.

If other analysers are included in the user's installation, steps 152 and 154 are iterated.

A "data sheet" can also be consulted, analyser by analyser, with the gas requirements for each analyser.

The total of the gas requirements is then produced (step 158), and this is done for each gas and for each grade or purity. In other words, all of the points of utilisation of a given gas are considered, and the total of the consumptions of all these points of utilisation is produced.

The entered data can then be corrected (step 160).

Then comes the step of choosing the packaging, as a function of the supplier and/or of the customer's constraints (step 162).

The constraints on the mixtures relate, for example, to the method of analysis or calibration used, the flow rate, the frequency of use, the service life of the mixture (the duration during which a given concentration can be maintained or guaranteed). The constraints on mixtures are not of the same type as those relating to pure gas. The links between the system 8 and the database or databases 5 and/or 6 can help in estimating the flow rates, the calibration frequencies, the service life of the mixtures, and therefore in simplifying the choice.

The method of supply (bottle, container, generator . . . ) is then chosen (step 164) and the equipment is determined (step 166) by consultation of the equipment database 7.

The user can choose a graphical representation of the whole of the installation (step 168), in which case a representation of the laboratory or of the factory is created (step 170), with the gas supplies and the apparatuses or the requirements.

The user can then calculate (step 172) the cost of the products which must be supplied (gas and, possibly, equipment). If this is not done, the program is terminated (step 180).

A proposal can then be produced (step 174). For example, the customers or users database 4 can be consulted in order to know the prices applied for that particular customer or user. Other databases can be consulted in order to gather the necessary information on the prices applied. The user can then modify certain parameters (step 176): in this case, the process is iterated, for example starting from one of the steps 154 or 162 or 164 or 166.

Finally, when no modifications are required, an offer can be produced (step 178), for example by printing on a paper medium.

Several offers can be produced: if another offer is requested, for another installation, the process restarts at step 152. For example, if a large investment is necessary for a new supply or new equipment, an annual cost can be calculated for each supply or each item of equipment, including the depreciation, and thus the user can carry out a comparison of the two corresponding offers.

If this is not done, the process is terminated (step 180).

The information gathered or obtained can be available for orders to a delivery service and/or a billing service and/or an installation service, for the purpose of producing the installation.

Figure 9A:
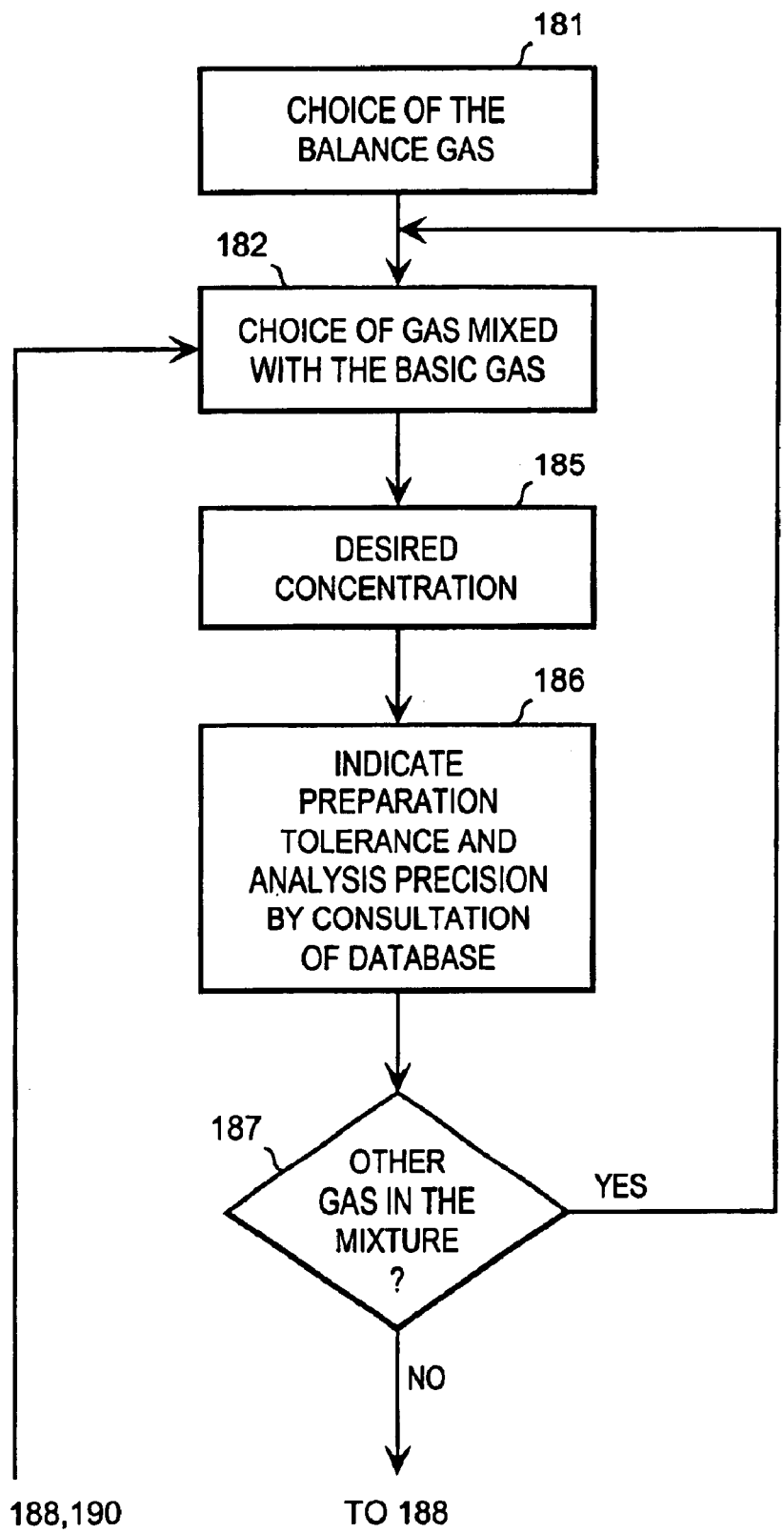
FIG. 9 is a flowchart of a process according to the invention, used in the case of gaseous mixtures.
Figure 9B:
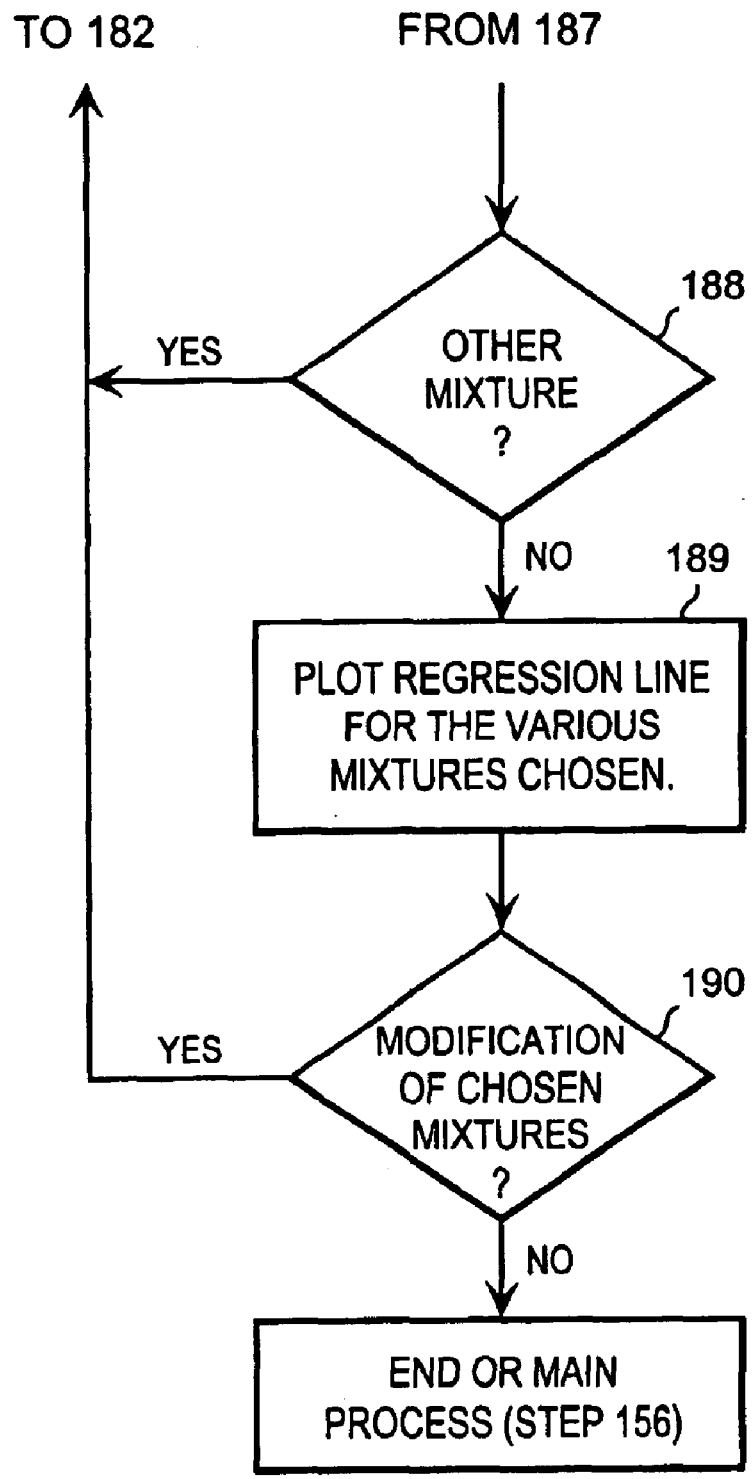

FIG. 9 shows a flowchart of a process according to the invention, used in the case in which the choice of a set of mixtures, at various concentrations, must be made.

In a first step 181, the balance gas of the mixtures is chosen.

Then a first gas, mixed with the balance gas, is also determined (step 182).

The desired concentration for this first gas is indicated by the user or by the customer (step 185).

The preparation tolerance and the analysical accuracy for the desired concentration are indicated or displayed (step 186) on the basis of information contained in then database 5. The latter can also propose mixtures that are in stock and which are close to the customer's request or compatible with the latter.

If a calibration must be carried out with other gas contained in the mixture, the customer or the user indicates it (step 187). In this case, steps 182 to 186 are iterated as many times as necessary.

The determination of another mixture is then, possibly, carried out (step 188).

Finally, the regression line obtained for the different mixtures chosen is plotted, or displayed (step 189), as illustrated in FIG. 7A.

If, on seeing the relative position of the regression line obtained with the chosen mixtures (straight line D' in FIG. 6) and of the theoretical regression line D, the customer or user decides to modify one or more of the concentrations, the process repeats step 182 (step 190).

If this is not done, the process is terminated, or the main process, whose flowchart has been described with reference to FIG. 7, is resumed, for example at step 156.

Figure 10A:
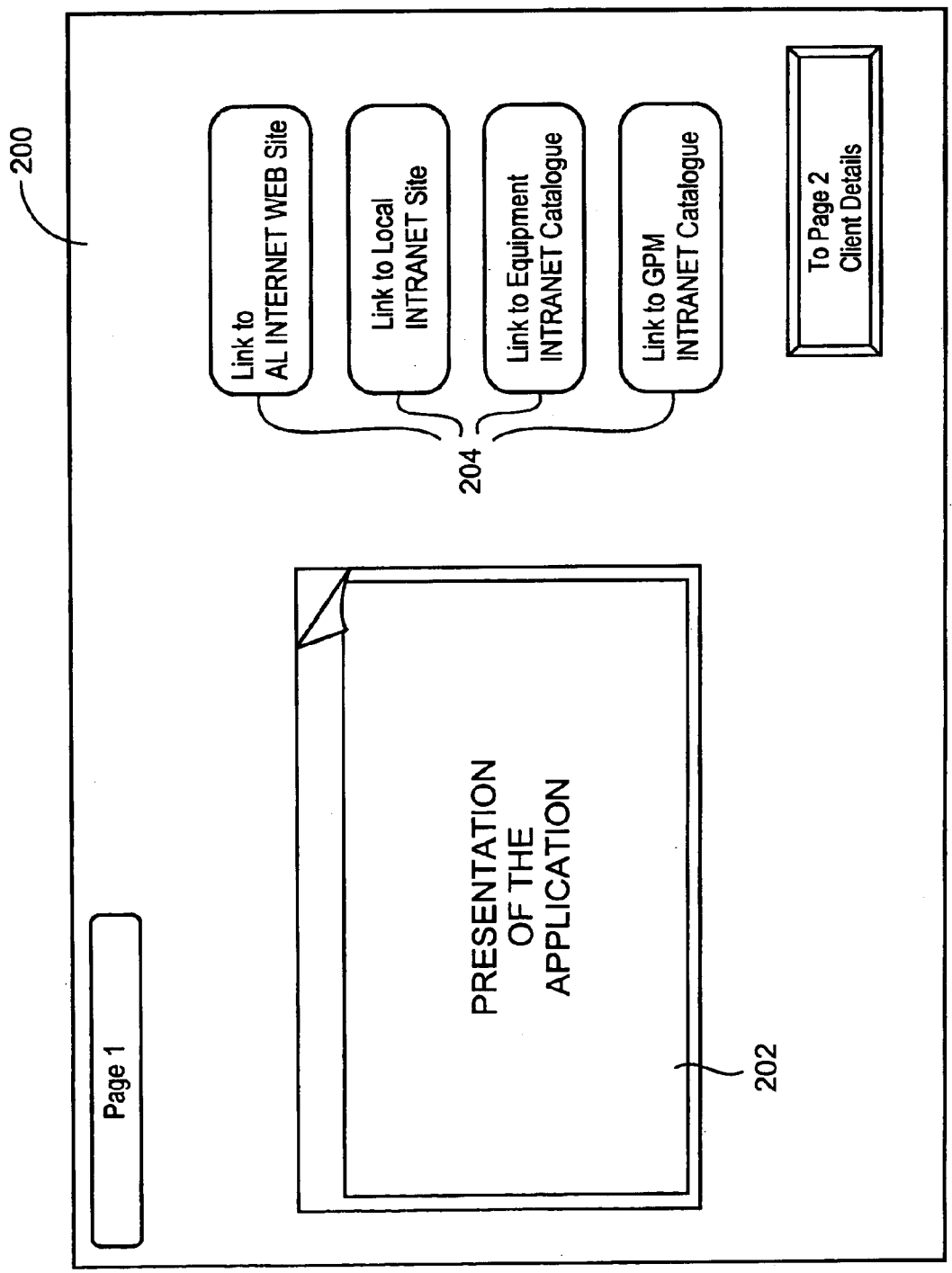
FIGS. 10A to 10R are examples of screen pages which can appear during the use of a process according to the invention.

FIGS. 10A to 10R represent various screen pages which can be displayed by an operator during the use of the process.

A first introduction page 200 (FIG. 10A) makes it possible to present the application with a description in a field 202 of that page. Various tabs 204 make it possible to select and execute other applications.

On the second page 206 (FIG. 10B), a first field 208 offers the possibility of inputting any details of the user. It is also possible to go, using tabs 210, to screen pages which will be described below, and which essentially relate to various possibilities of direct offers of gas (liquids, mixtures) or of equipment.

The user can also enter in the field 212 any data relating to the description of the laboratory or the factory concerned or of the place of use of the gas.

The choices made on this page are validated by clicking on an icon 214.

It is then possible, by clicking on the tab 216, to select the screen page 218 which relates to the choice of one or more analysers or of another requirement or of another application.

Figure 10B:
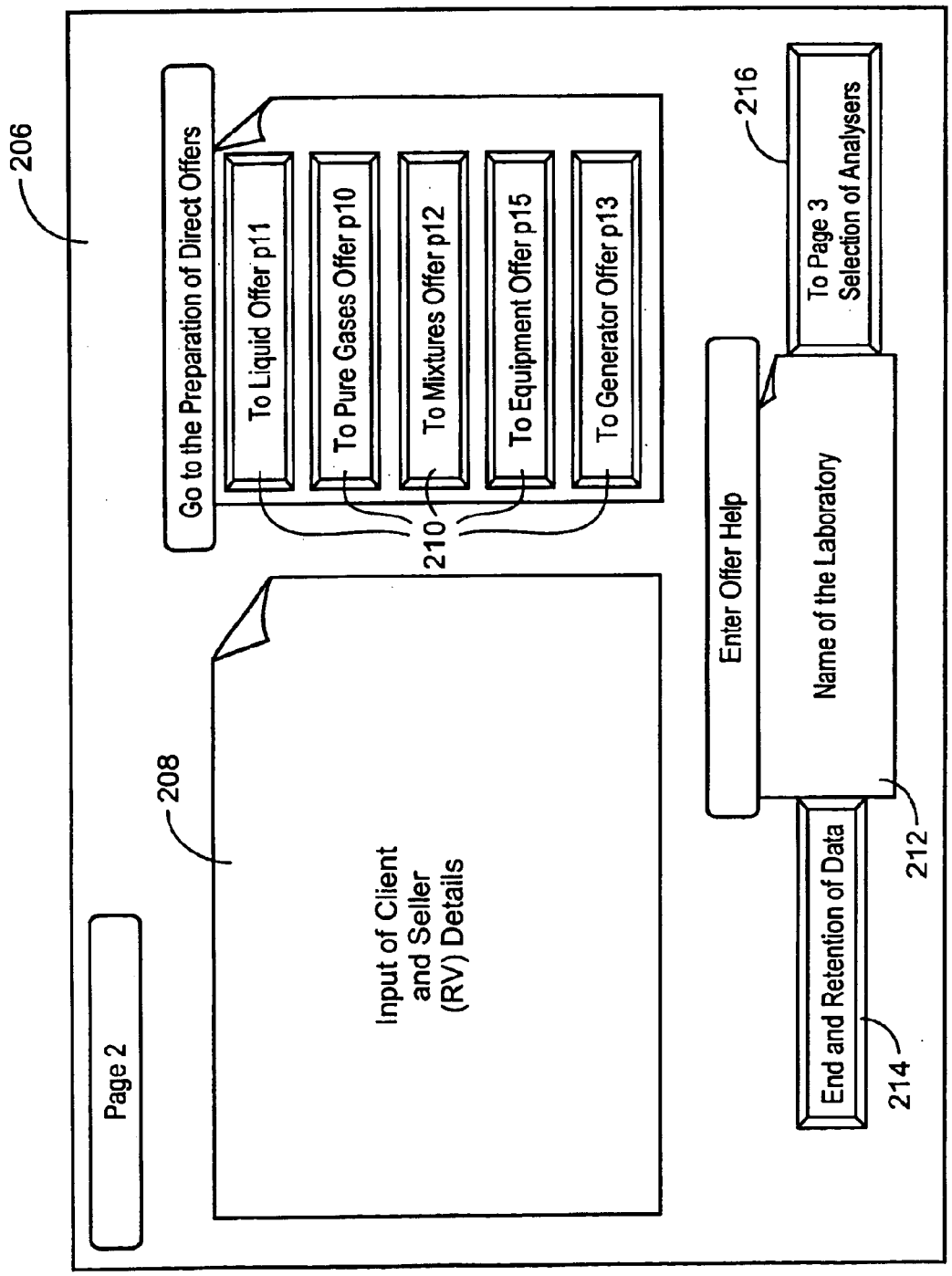
Figure 10C:
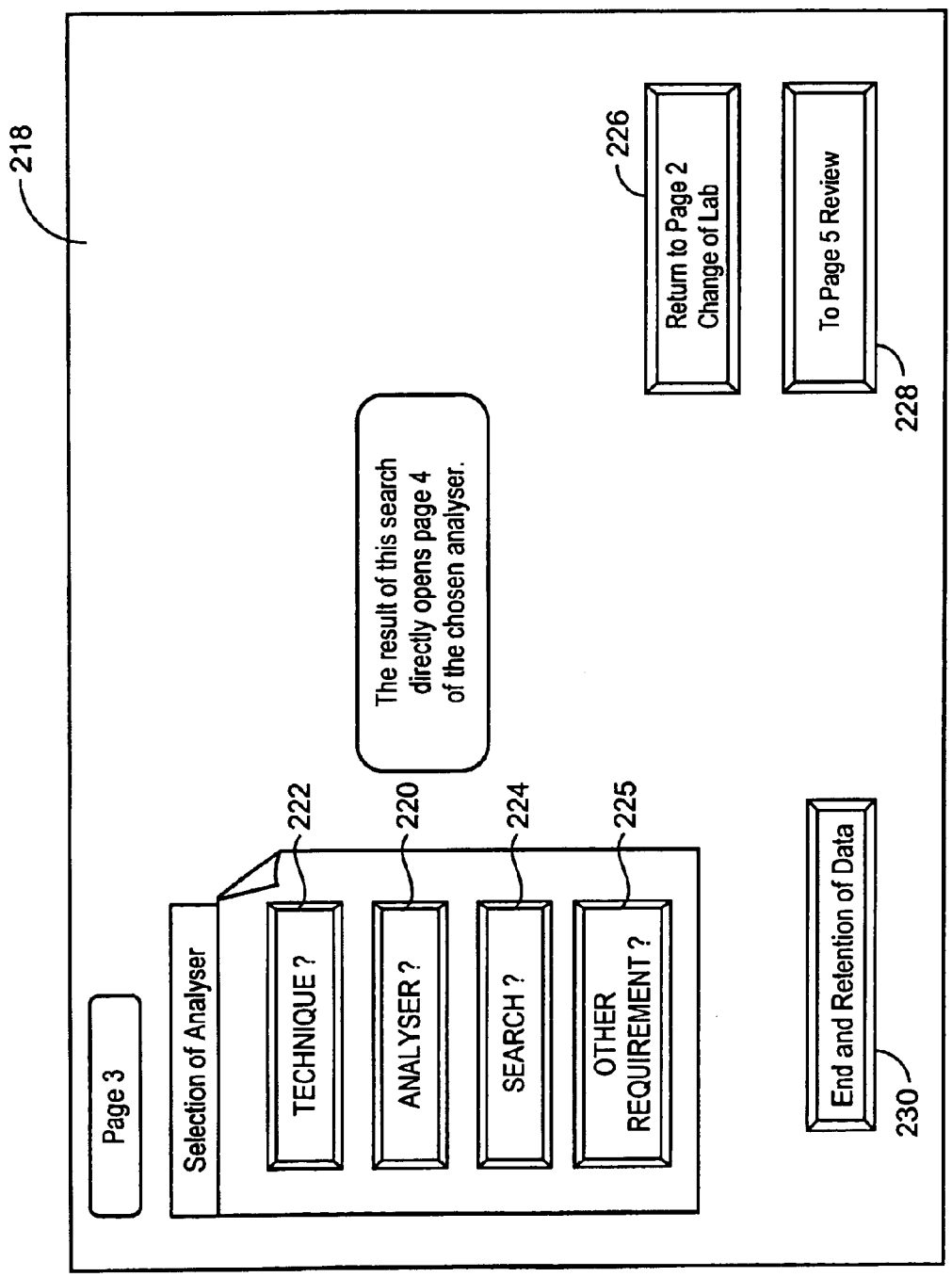

The latter is shown in FIG. 10C. The selection of !the analyser can be made by choosing the name of the analyser from a scrolling list (in this case, it is 11 necessary to click on the icon 220) or by entering the name of the technique used (icon 222), or by a search carried out, for example, by key words (icon 224). A tab 225 makes it possible to go directly to page 244 (FIG. 10E).

The user can also return to the previous page (tab 226) or go to the summary page (described later, tab 228) or simply store the data already entered and selected (tab 230).

In the latter case, the next page 232 (FIG. 10D) is opened directly: it makes it possible to assemble, for each selected analyser, the various information relating to it. A field 236, 238, 240, 242 is provided for each gas used for a given analyser. For example, for an analyser which necessitates the creation of a flame, there will be at least one field 236 for oxygen and one field 238 for hydrogen. The data on the pressure and the flow rate of each gas are completed automatically during the consultation of the database on the analysers or the apparatuses.

The data on the standby flow rates or on the standby times are completed by the user or by the customer. In default, they are set to zero.

At the top of this page there are recalled, in the fields 234 provided for this purpose, data relating to the corresponding analyser, for example the units of the flow-rate, or pressure, or operating time measurement.

If necessary, another page 244 is displayed (FIG. 10E) for other requirements, with one or more additional fields 246. Such a page is particularly called up for a requirement not recorded in the analysers data base 6, for example a glove box.

A summary page 248 (FIG. 10F) makes it possible to summarise all of the information entered on the various analysers and the corresponding gas. The order of the columns in FIG. 10F is given by way of indication and can be modified. Selection buttons 250 make it possible to choose between various possible presentations. Thus, the arrangement shown in FIG. 10F relates to the "analyser" selection.

This page provides a tabular representation of what has been input and makes it possible to have an overall view of unit requirements.

For each analyser there is given the list of necessary gas: in the illustrated example, it can be seen immediately that the gaseous-phase chromatograph identified by GC/ECD necessitates two helium supplies (with different flow rates) and one calibration gas supply $CF_4/N_2$.

A button 252 makes it possible to validate all of the displayed data. Other fields 256 can contain various information (volume and number of empty bottles to be retrieved). Buttons 254 make it possible to return to previous pages or to go to following pages.

Page 258 (FIG. 10G) makes it possible to execute the calculations of consumption, per laboratory or room, for each of the gas. Clicking on a tab 261 makes it possible to start the calculation for a given gas. A table 260 collects the various data for a given gas. In particular, a column 262 of the table can give the list of analysers for which the chosen gas, with a given purity, will be used. The buttons 263 ("Association of laboratories") makes it possible to assemble the rooms or laboratories into conglomerates depending on the same supply.

A tab 264 makes it possible to validate the calculations and to store them, whilst other tabs 259 make it possible to return to the previous page for correction or to go to the next page.

A page 260 (FIG. 10H) makes it possible to assemble the data relating to the constraints of the manufacturer and/or of the customer or of the user, these data being used in particular for determining the choice of the supply.

At the top of the screen, buttons 262 make it possible to select the desired gas and purity. A field 264 collects and displays the data for each pair (gas, grade) selected with the buttons 262.

The customer's constraints are collected in a field 266. These constraints relate in particular to the storage (for example: is there sufficient space to install a container; must the bottles be stored indoors . . . ) and/or the handling (is there personnel at the customer's premises able to handle the bottles?) and/or the need for continuous supply, . . .

The constraints of the manufacturer or of the supplier are collected in a field 268. These constraints relate in particular to the time intervals between two successive delivery rounds of liquid or gaseous gas.

Other constraints are collected in a third field 270 and relate to the services which are able to be supplied by the manufacturer or the supplier.

A tab 272 makes it possible to validate and to store the data entered regarding the constraints.

A page 274 (FIG. 10I) makes it possible to proceed with the choice of packaging. According to the previously entered data, the software proposes, for each gas, a possible packaging. In the table 276, column 278 indicates the packaging, column 280 the number of bottles necessary (or the volume or the necessary flow rate, for bulk gas).

The user can choose to select certain proposed packagings or not, by ticking a corresponding box in column 282. The next column 284 indicates, for example, the number of days of autonomy for the choice made.

Two boxes 278-1 and 278-2 are provided at the bottom of column 278 for the case of an offer of a generator or of liquid gas. If the customer validates one of these offers by clicking on one of the boxes 282-1 and 282-2, one or other of the pages dedicated to generators and to cryogenic reservoirs (called "rangers" in English terminology—containers for liquid gas) is displayed on the screen. These pages will be described below.

A tab 286 makes it possible to validate the choices made and to store them, whilst other tabs 287 make it possible to return to the two previous pages for correction or for selecting other gas or for going to the next page 292.

At the top of this page 274 are reviewed, in a field 288, data relating to a given gas. The volume between two deliveries recalls the volume that the customer consumes between two deliveries (at this stage, the total consumption/time between two rounds ratio has already been calculated).

It is also possible to go directly to the "production of the offer" page (described below) by clicking on the tab 290: in fact, at this stage, all of the data are available for making a first offer. But this offer does not yet cover the equipment to be used in order to produce the installation.

The next page 292 collects the data on the choice of hardware or equipment.

This page essentially presents a field 294 corresponding respectively to the packaging chosen for a gas and a given purity, with the equipment obtained by assembling various data from the database 7. This page shows an assembly of these various elements in such a way as to ensure the desired distribution whilst retaining the purity up to the point of use.

Figure 10D:
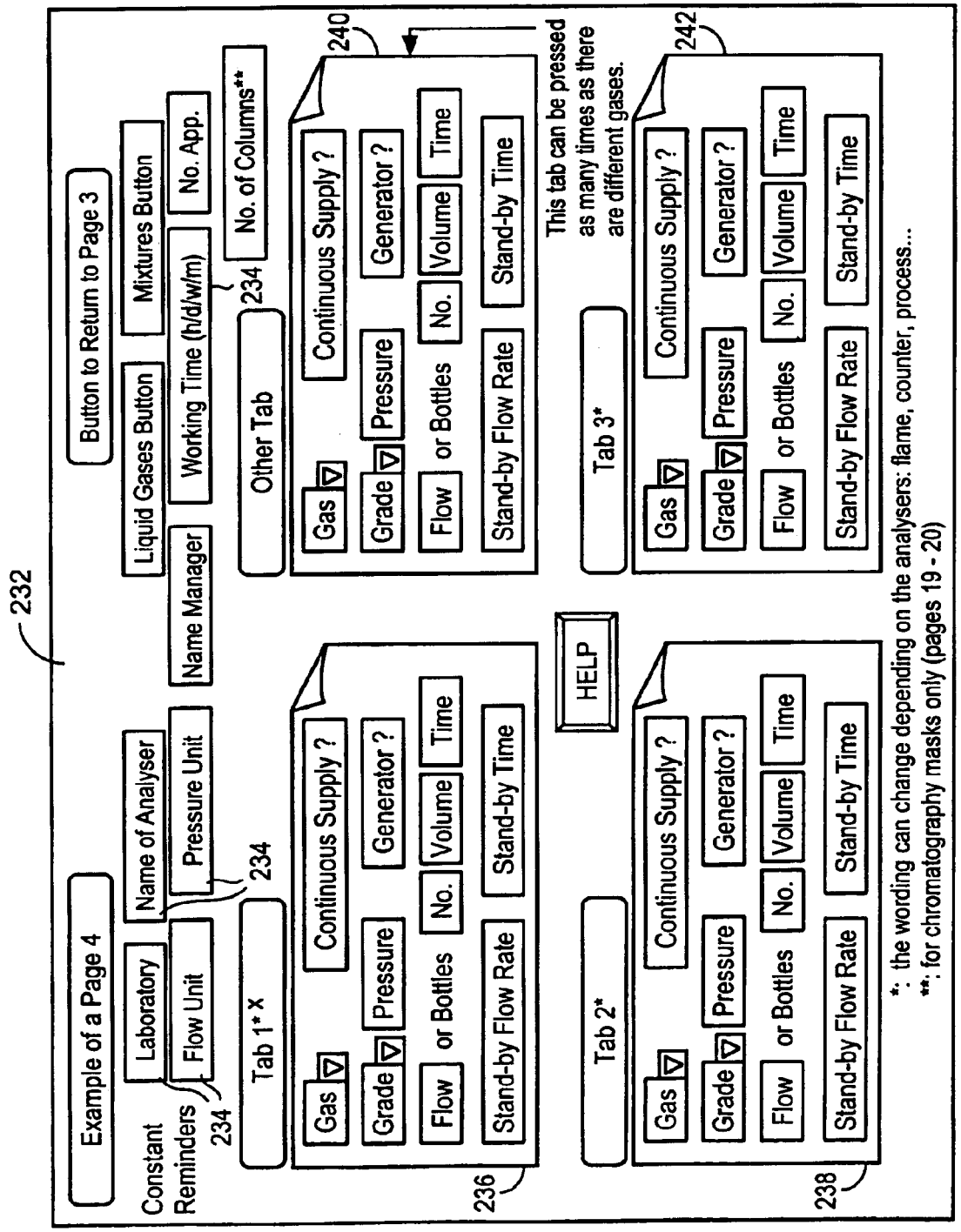
Figure 10E:
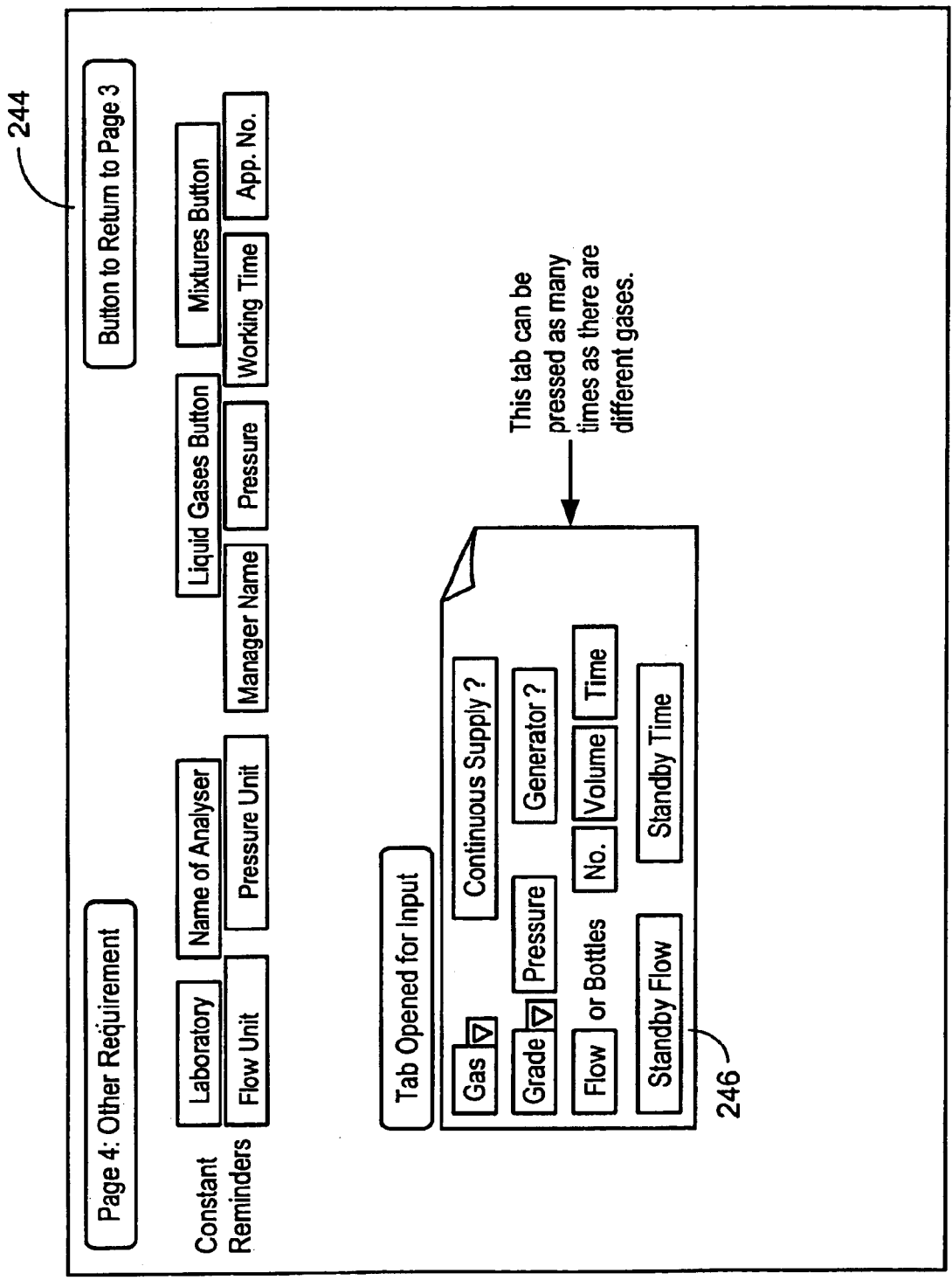
Figure 10G:
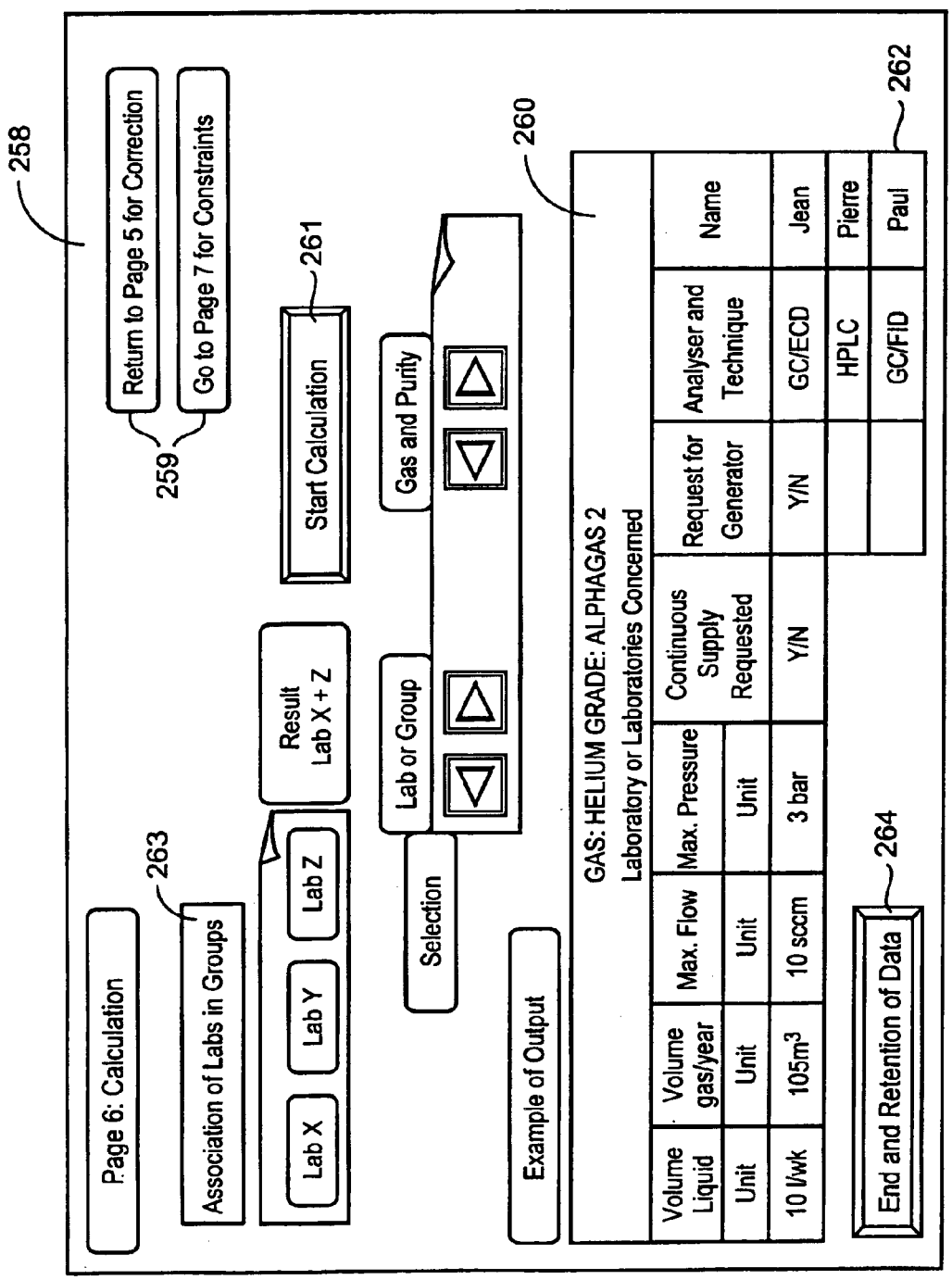
Figure 10H:
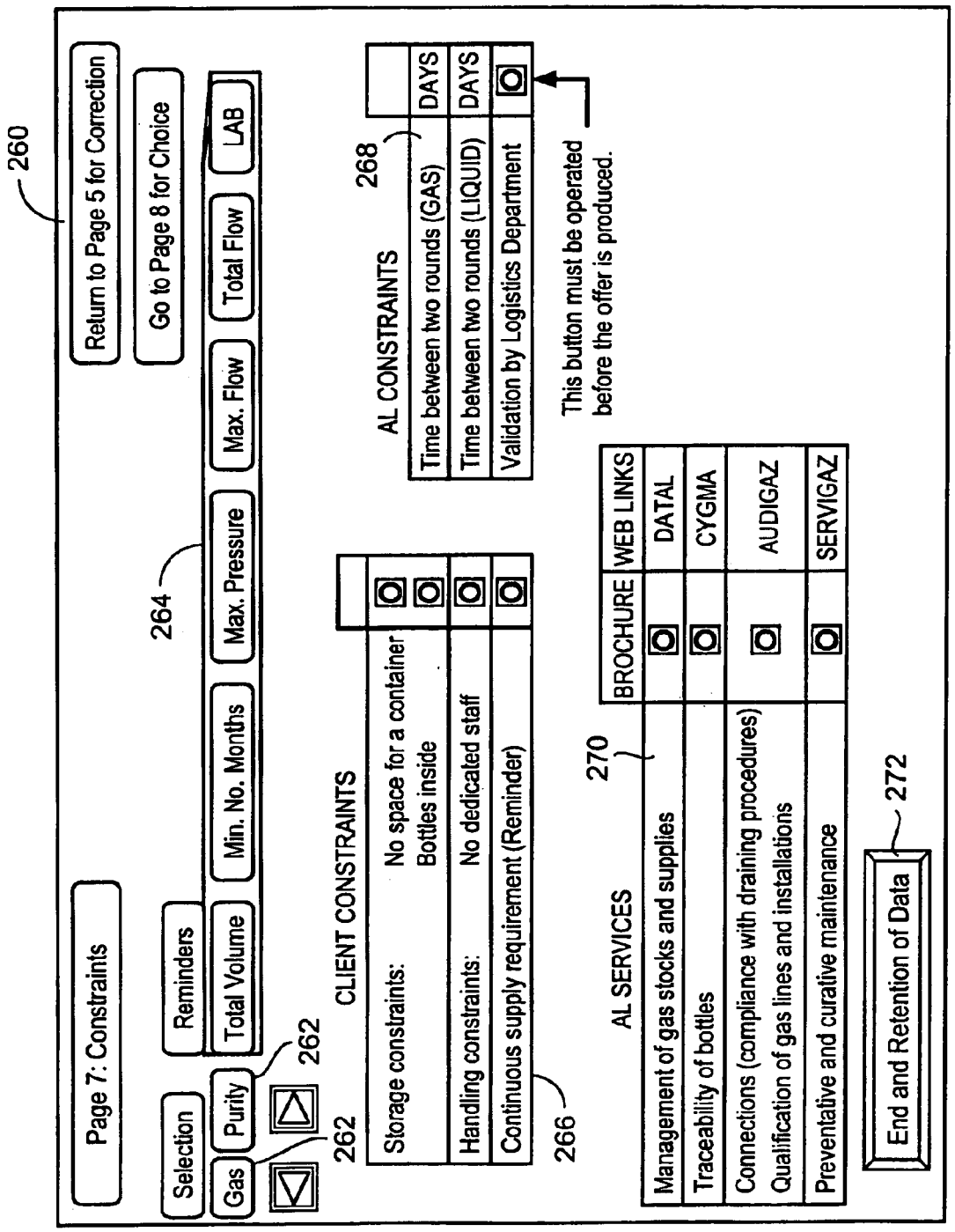
Figure 10I:
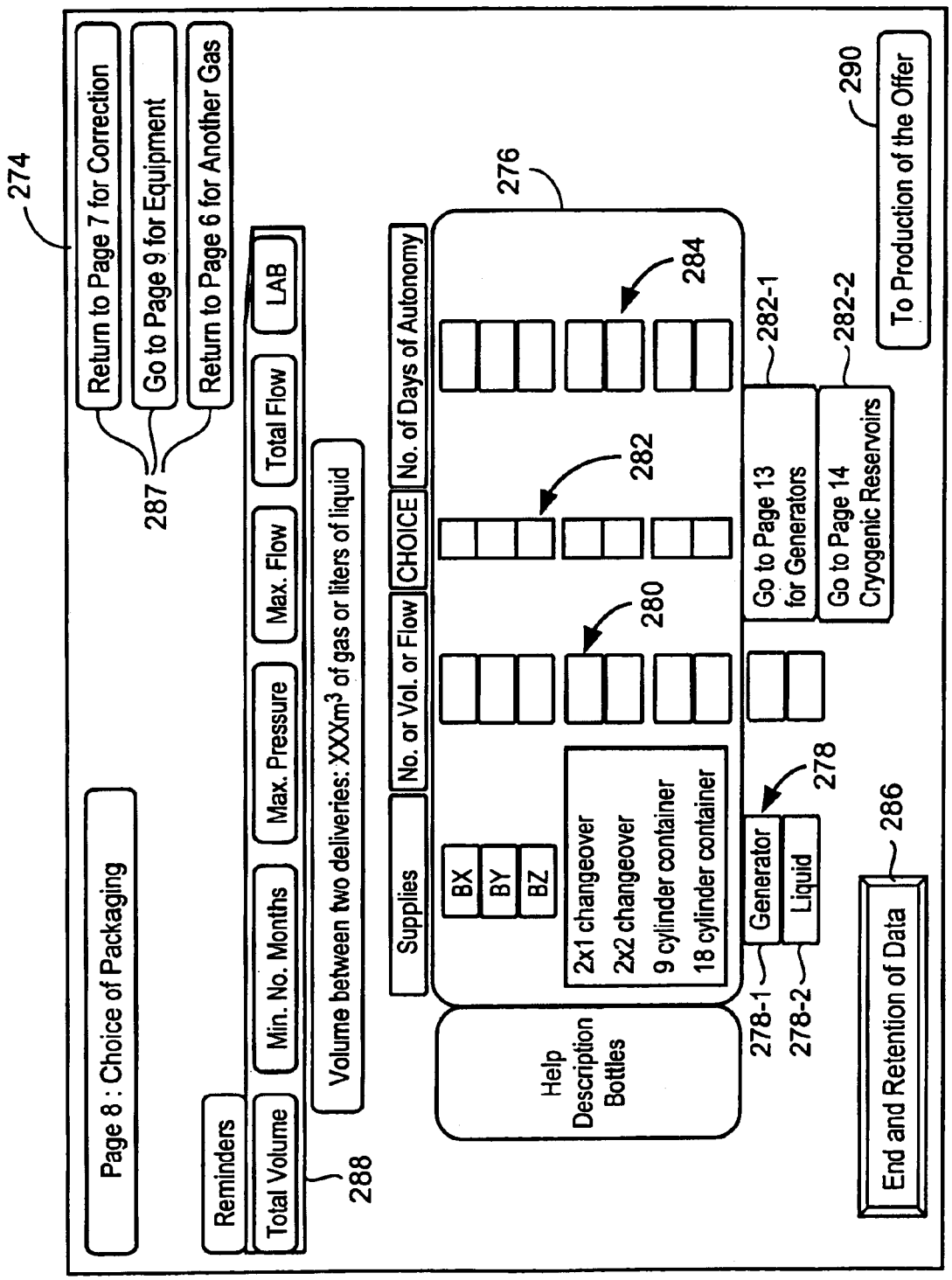
Figure 10J:
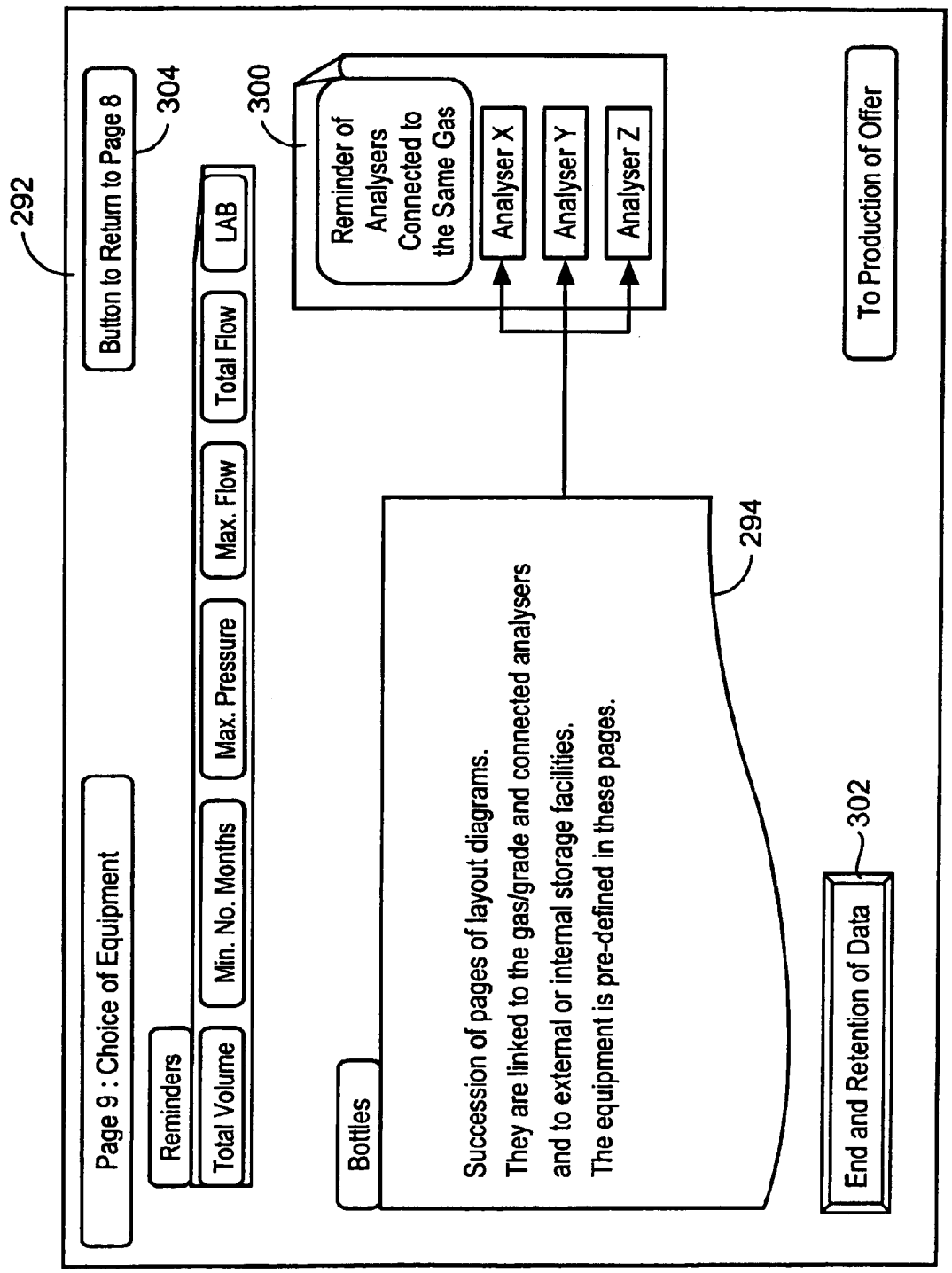
Figure 10K:
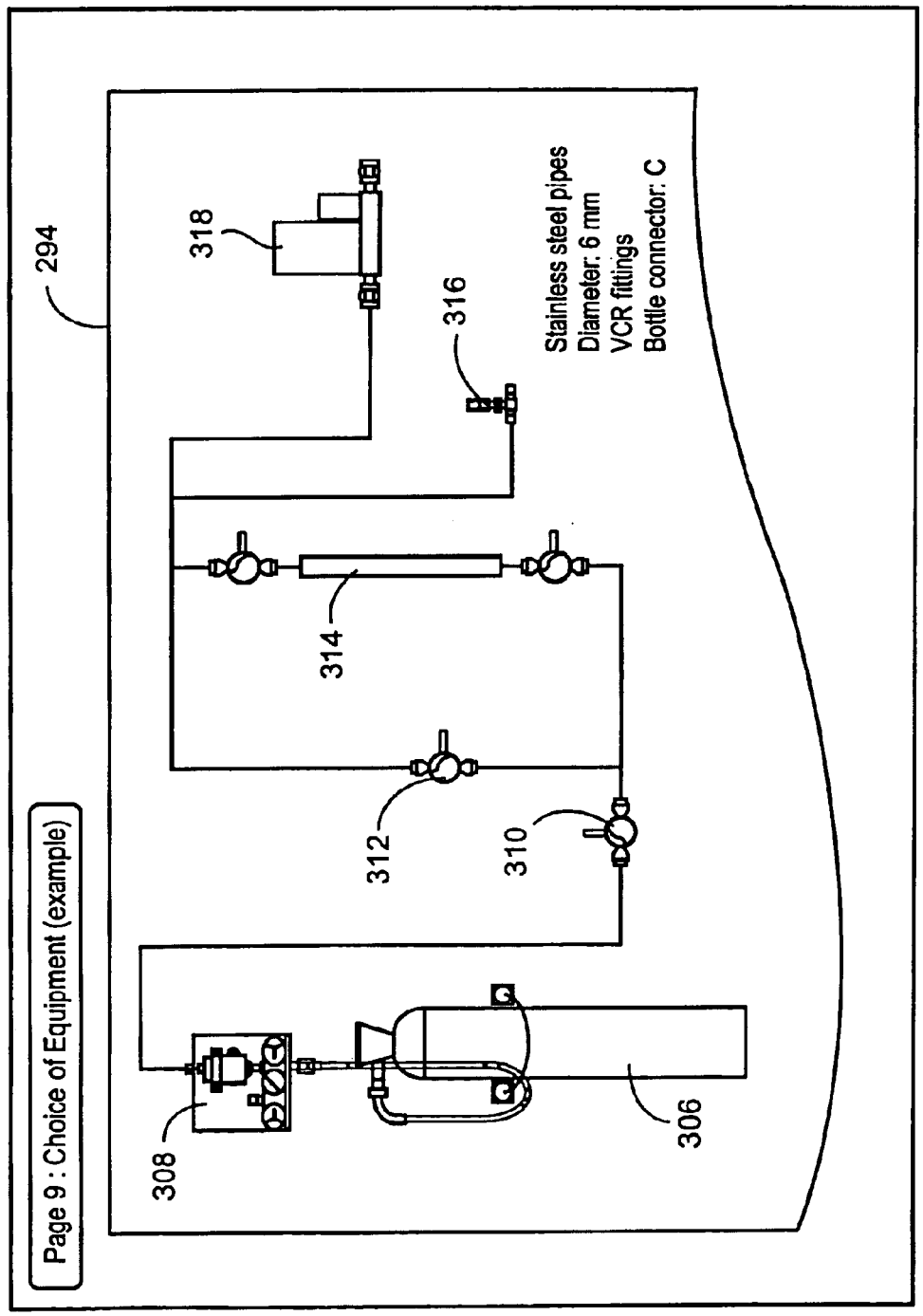

An example of what can be displayed in this field 294 is given in FIG. 10K. The reference 306 denotes a cylindrical gas bottle, to which is connected a pressure reduction valve assembly 308, upstream of a low-pressure reduction valve 310. Next there is, in parallel, a low-pressure valve 312, and a purifier 314 connected either to a regulating valve 316 or to a mass flow meter 318.

As shown in the figure, there can also be displayed in the field 294 information on the connecting pipes and/or on the connections of the packaging and/or of the apparatuses to these pipes. Other examples of representation which can be displayed are those of FIG. 3, 4 or 5 in greater or less detail. Several of these representations can be displayed on page 292, in superimposition, the operator choosing, for example by clicking on a point in one of the representations, which of these representations he wishes to display in full.

This field 294 can appear simultaneously with a table 300 listing all of the analysers which are connected to a same gas.

At the top of page 292, data for a given gas are recalled.

A tab 302 makes it possible to validate and store the displayed data.

A tab 304 makes it possible to return to the previous page, and a tab 306 makes it possible to go directly to the "production of the offer" page (described below): at this stage, all of the data are available for making an offer, including equipment.

Various technical information can be given on the diagram, as illustrated in FIG. 10K.

Figure 10L:
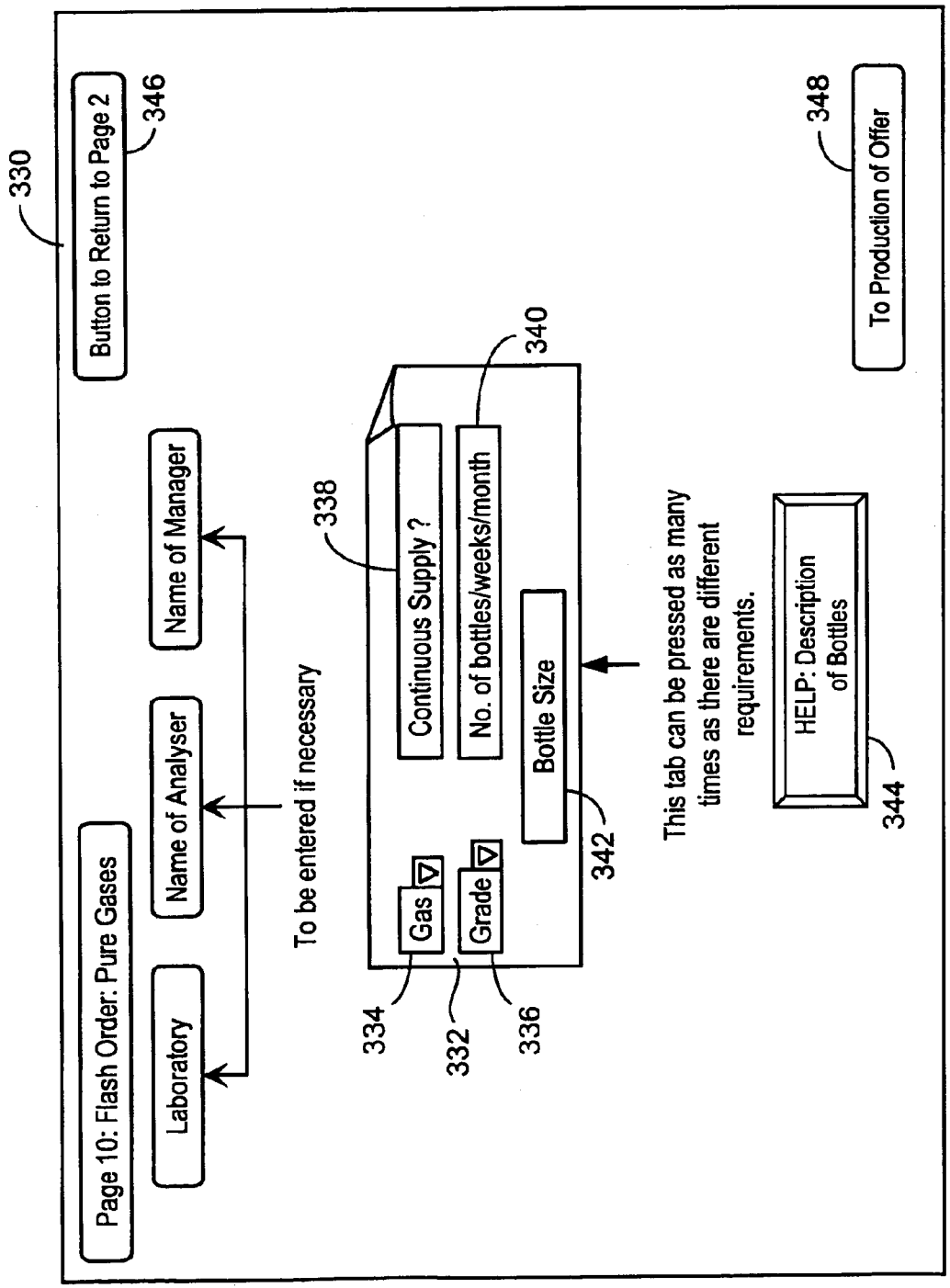
Figure 10M:
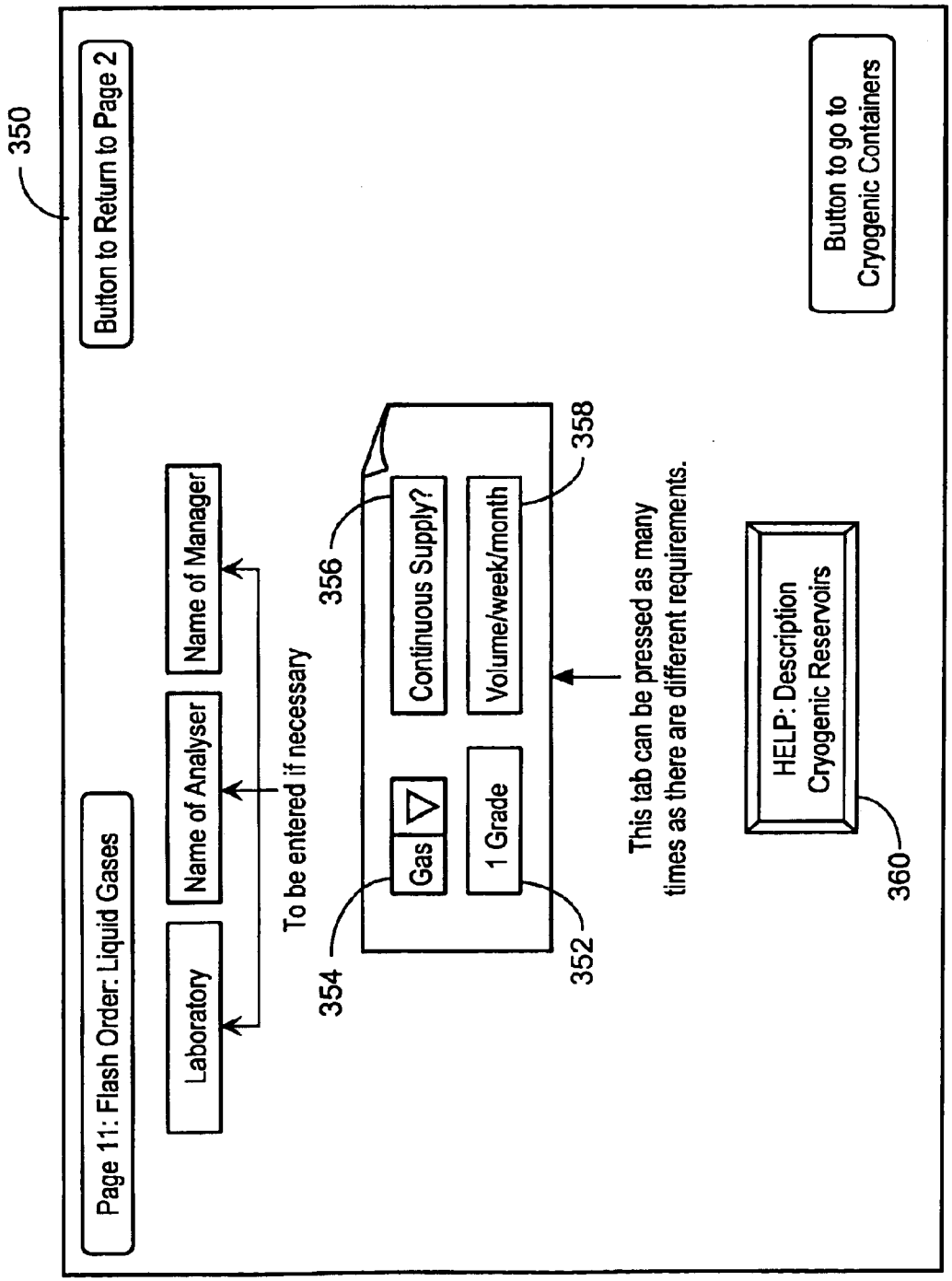

Pages 330 and 350 (FIGS. 10L and 10M) are not a logical continuation of the previous pages, but appear after page 206 when the "pure gas" or "liquid gas" offer has been chosen using the icons 210 (see FIG. 10D). These pages 330 and 350 are in some way order forms which make it possible to respond to simple requests. If a customer or a user wishes to order directly pure or liquid gas, one of other of these pages is filled out.

For example, for page 330, in a field 332 there will be indicated, using tabs 334 and 336, the nature and purity of the desired gas. It will also be possible to indicate whether the supply is made continuously (tab 338) or whether it is desired to order a certain number of bottles, possibly with the corresponding periodicity (tab 340). The size of the bottle must also be indicated (tab 342).

The field 332 can be filled out successively for different gas and different orders.

Possibly, a tab 344 makes it possible to call up a description of the various bottles which the manufacturer or supplier can offer. This description is stored in the memory of the computer system 8 and/or sent to the system 2.

Additional information can also be entered at the top of this page 330, on the name of the laboratory and/or the analyser for which the order is made, and possibly on the person responsible for the order.

A tab 346 makes it possible to return to page 206 (FIG. 10B). A tab 348 makes it possible to go directly to the production of the offer.

The data to be entered on page 350, in a field 352, relate to the nature of the gas (tab 354) and the supply modes (continuous or not, tab 356). The requirements in volume, possibly with the periodicity of these requirements, can be indicated in tab 358. The field 352 can be filled out as many times as there are different requirements for liquid gas.

If necessary, a description of the liquid gas available, and of their packaging ("rangers", or cryogenic containersdisplayed by making use of a tab 360. Such a description is contained in the memory of the system 8.

The other tabs (possible information, return to page 206 button, and button to production of the offer) are identical to those of the previous page.

Figure 10N:
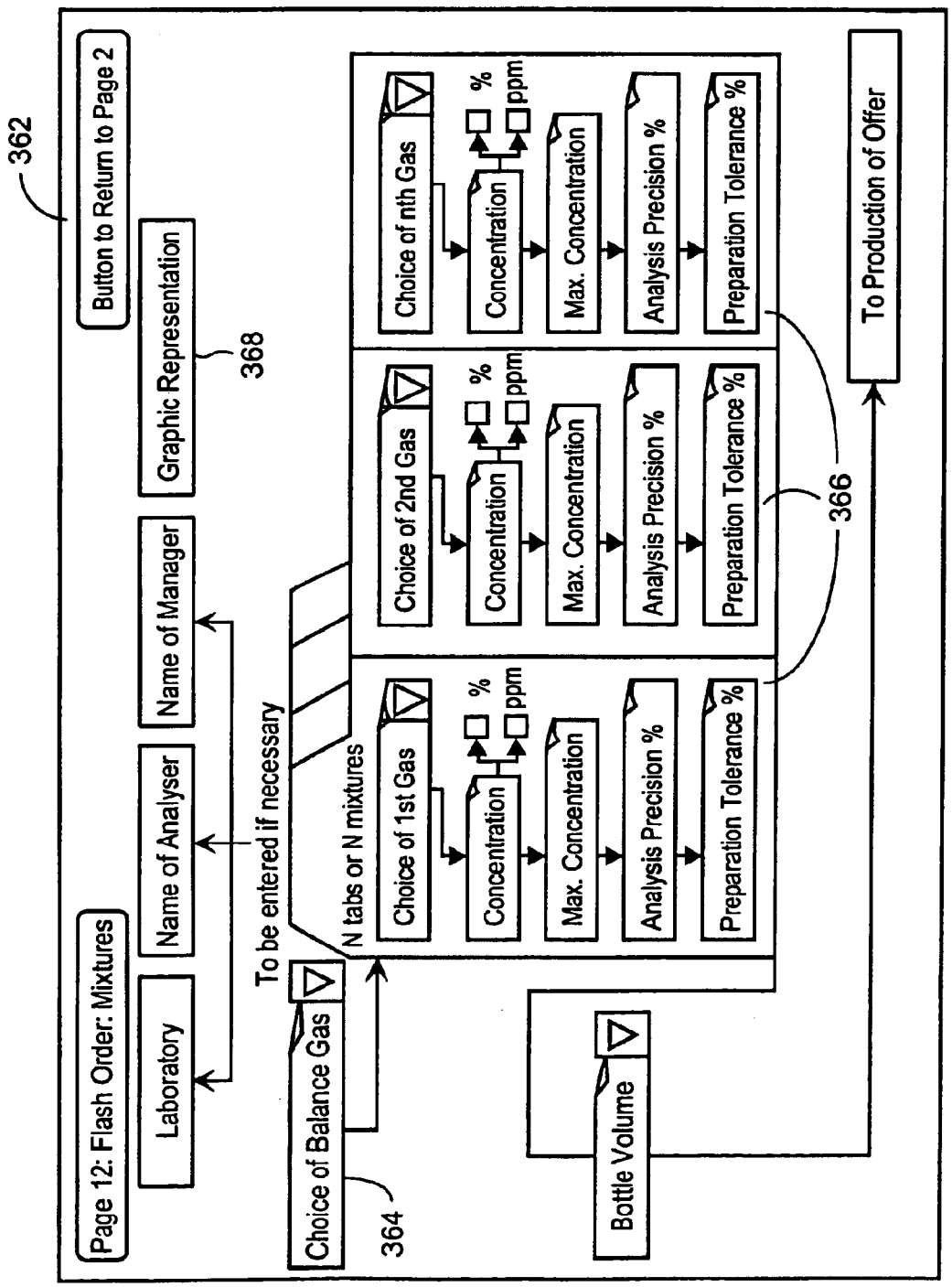

Page 362 (FIG. 10N) relates to the case of an order for mixture.

A first tab 364 makes it possible to select the balance gas. Then, for the different gas mixed with the balance gas, sub-tables 366 are completed.

Each subtable comprises the choice of gas, the choice of its concentration (in % or in ppm), the indication of the desired maximum concentration, and the analysis precision and the preparation tolerance (data coming for example from the gas database 5) which it is possible to obtain with the desired concentration (see the explanations given above with reference to FIG. 6, on the subject of the preparation tolerance and of the analysis uncertainty).

If several concentrations of a same mixture are chosen in view of carrying out a calibration, a graphical representation tab 368 can be clicked in order to cause the appearance of a representation such as that shown in FIG. 6 or in FIGS. 7A and 7B, where there can be seen, on the one hand, the theoretical calibration straight line and, on the other hand, the calibration straight line obtained by regression, with the chosen mixtures and concentrations.

The screen will then display a page which contains, on the one hand, the calibration straight line (like the one in FIG. 6 or 7A) and, on the other hand, a tab which offers the possibility of returning to the previous page 362 and to modify on it the various chosen concentrations.

Page 370 (FIG. 10O) makes it possible, in the case of the choice of a generator, to present various characteristics of various generators. This page follows page 206, after an operator has clicked on the "to generator offer" icon 210.

On this page 370, various references 372 of generators are presented, with the possibility of obtaining information, on each of these generators, by clicking on a tab 374. The choice of such and such a generator can be validated by ticking or clicking a tab 376.

This page furthermore comprises a button 378 for returning to screen page 206, a button 380 for returning to screen page 274 and a button 382 which makes it possible to go directly to the production of the offer.

General data can be recalled at the top of the screen 370, in a field 384.

Finally, a customer or a possible user can indicate his desire to hire or purchase the compressor or the apparatus in question using buttons 386.

The screen page 388 (FIG. 10P) is a cryogenic container selection page, that is to say selection of the packaging of a given liquid gas. The various available packagings are indicated in a first column 390. A user who wishes to have fuller information on one or other of the proposed packagings can click the corresponding button in a column 392. In order to select the purchase of a particular packaging, it suffices to click the corresponding button in column 394.

This page 388 furthermore exhibits the same types of buttons for return 396, for selecting the production of the offer 398, and the same type of recall field 400 as the screen page 370 described previously.

Figure 10O:
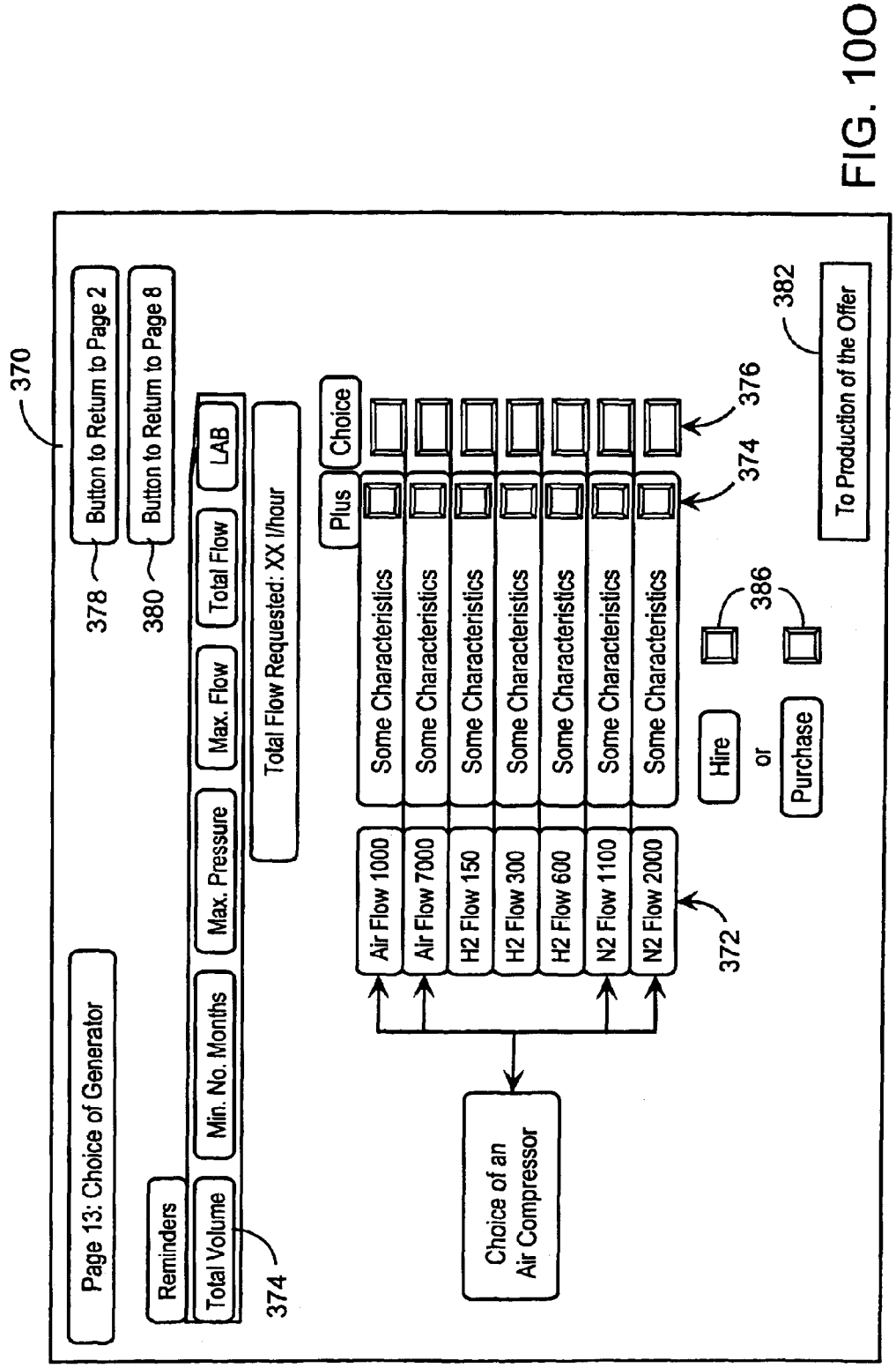
Figure 10P:
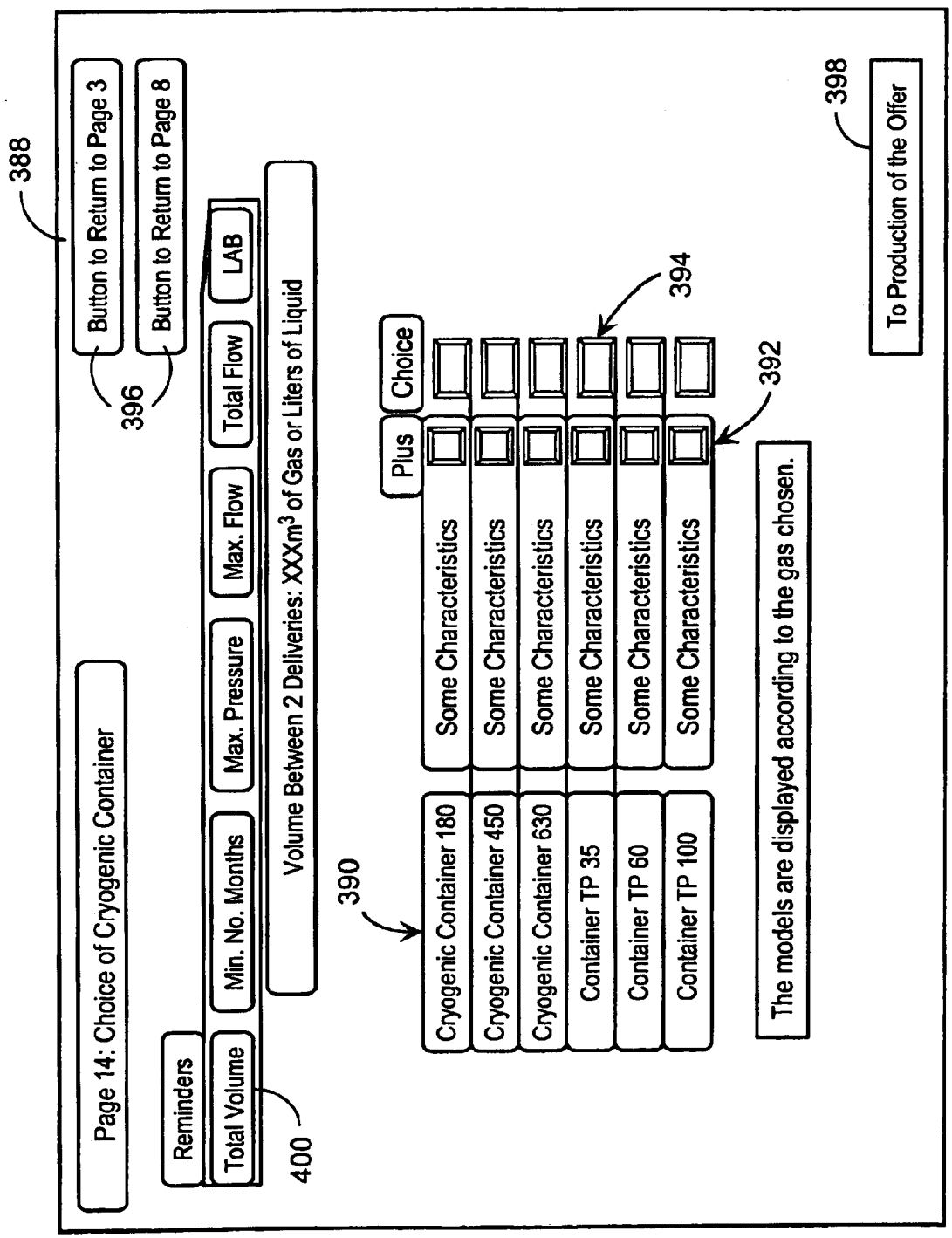
Figure 10Q:
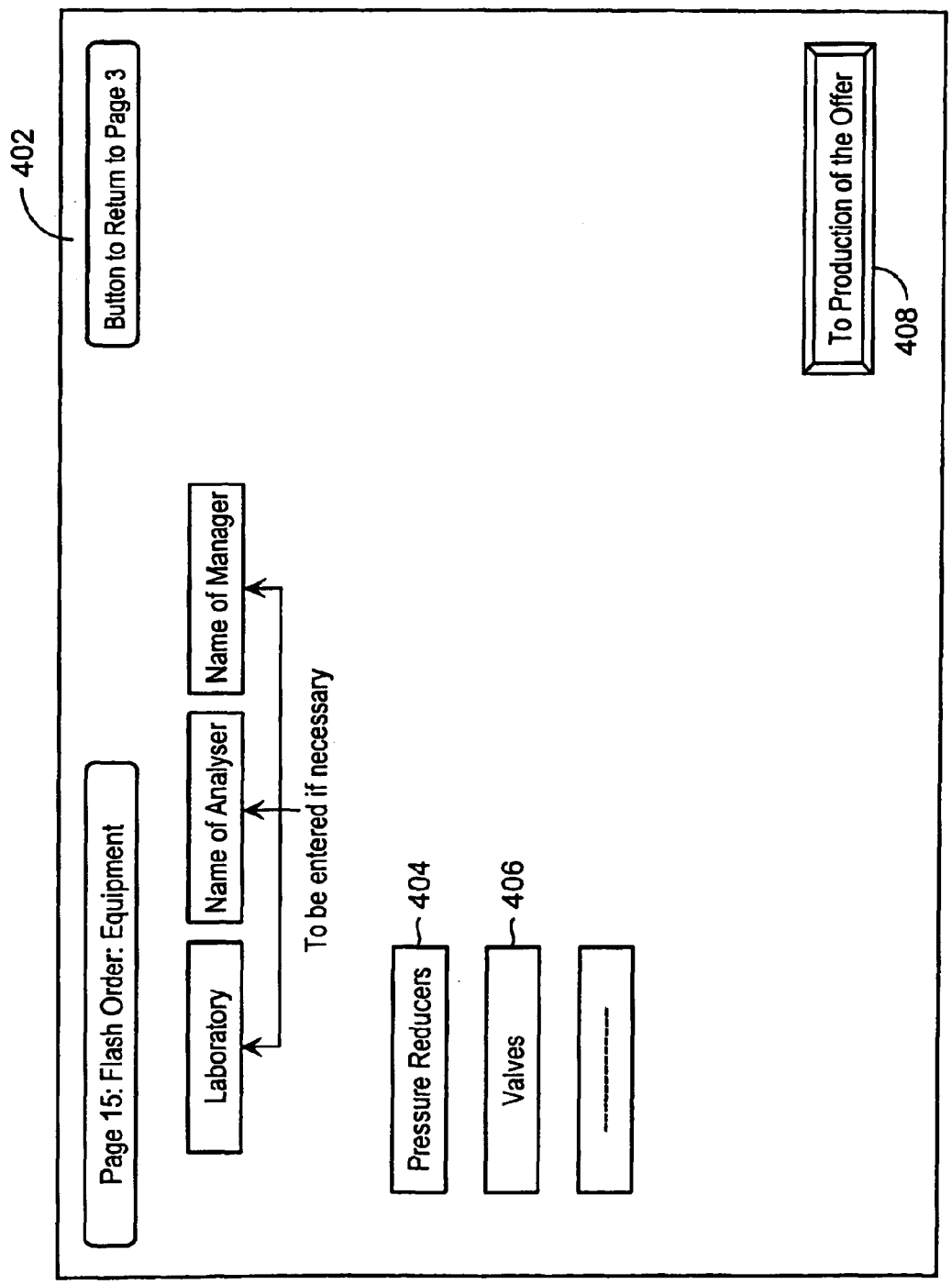

FIG. 10Q shows a page 402 which appears after selection, on screen 206, of the button 210 "equipment offer" (direct offers). This is again a matter of "order forms" in order to meet the requirement of a customer or user who wishes to order equipment directly. On this page 402, the user can select various headings, or chapter titles, by clicking on the corresponding tabs 404, 406, . . . For each selection there then appears a page of description of the various apparatuses under each heading and order, similar to page 370 (FIG. 10O). It is then possible to return to page 206 (FIG. 10B) or to go directly to the production of the offer (button 408).

The offer is produced on page 410 (FIG. 10R) which will bring together all the data on the ordered gas, mixtures and equipment. A button 412 offers the possibility of returning to one of the previous pages, for example page 206 (FIG. 10B). This makes it possible to produce a new offer immediately after the 1 first one and to make a comparison between the two offers.

The process according to the invention uses programs, both at the server or system 2 end and at the user end. At the server end, the VB Script language may be used for the programming (generation of HTML code). Java Script may be used for the programming at the customer end. The requests may be formulated in SQL.

The instructions of the programs for implementing a process according to the invention are stored in a memory zone of the computer system 8 or of the system 2. These instructions are for example installed from a medium which can be read by the computer system 8 and on which they are recorded. Such a medium can be, for example, a hard disk, a Read Only Memory (ROM), a compact optical disk, a Dynamic Random Access Memory (DRAM) or any other type of RAM memory, a magnetic or optical storage element, registers or other volatile and/or non-volatile memories.

What is claimed is:

1. Process for producing a diagram of an installation using apparatuses, each apparatus being supplied with gas, comprising:
    the consultation of one or more databases (6) comprising, for each apparatus, data on the flow rate, the nature, the purity of the gas supplying the apparatus, and the supply pressure of that gas for that apparatus,
    the selection, for each apparatus, of a value or of a limit value of duration or frequency of use,
    the calculation, for each apparatus, of the consumption, or of the limit consumption, according to the utilization value and to the flow rate data,
    the calculation, for each gas and for each gas purity, of the total of the consumptions of all of the apparatuses,
    the consultation of a database (5) for proposing, for each gas and each gas purity, a packaging, according the consumptions and the technical constraints relating to the storage of the gas and/or to their delivery.

2. Process for producing a set of data for the constitution of an installation using apparatuses, each apparatus being supplied with gas, comprising the production of a database containing:
    for each apparatus, the data on the nature and the purity of the gas for that apparatus, together with the flow rate, the supply pressure and the consumption of each gas for that apparatus,
    the total of the consumptions of all the apparatuses, for each gas and each gas purity,
    data relating to a packaging, for each gas and each gas purity, as a function of the consumptions of the apparatuses.

3. Process according to claim 2, the production of the database comprising the following steps:
    the consultation of one or more databases (6) comprising, for each apparatus, data on the flow rate, the nature, the purity of the gas supplying the apparatus, and the supply pressure of that gas for that apparatus,
    the selection, for each apparatus, of a value or a limit value of duration or frequency of use,
    the calculation, for each apparatus, of the consumption, or of the limit consumption, according to the utilization value and to the flow rate data.

4. Process according to claim 2, the production of the database furthermore comprising the consultation of a database (5) for proposing, for each gas and each gas purity, a packaging, as a function of the consumption.

5. Process according to claim 4, the packaging, for each gas and each gas purity also depending on technical constraints relating to the storage of the gas and/or to their delivery.

6. Process according to claim 1, furthermore comprising:
    a step of consultation of a database (7), comprising data on gas installation equipment,
    searching, in this database, for the equipment (90–100, 104, 106, 108) making it possible, for each packaging and each apparatus, to connect the said packaging to the said apparatus (105, 107 ,109).

7. Process according to claim 6, the consultation of the database (7) comprising data on gas installation equipment, and searching, in that database, for the necessary equipment (90–100, 104, 106, 108) comprising:
- a first step consultation and searching for the high-pressure section, associated with each gas packaging,
- a second step of consultation and searching for the low-pressure section, associated with each apparatus supplied with that gas.

8. Process according to claim 7, the first and second steps of consultation and searching furthermore comprising a display or visualization which shows:
- in the first step: the storage or the packaging of the gas, and the equipment necessary for the functioning of this storage or this packaging,
- in the second step: the connections to be made between the outlet of the storage or the packaging of the gas and the apparatus supplied with that gas.

9. Process according to claim 2, comprising:
- the production of a diagram or graphical representation, as a function of the data contained in the set of data.

10. Process according to claim 1, furthermore comprising a step of graphical representation of the installation comprising the said apparatuses (52, 54, 56, 58, 60; 72, 74, 76, 78, 80, 82, 105, 107, 109) and the gas sources (62, 64, 66, 96, 306) to which they are connected.

11. Process according to claim 9, the graphical representation being preceded by a step of selection of a graphical representation, or of a type of graphical representation, from among several possible graphical representations or types of representation.

12. Process according to claim 9, the diagram or graphical representation, or one of the graphical representations, being three-dimensional and comprising a representation of the ductings (70) connecting the said apparatuses to the gas sources.

13. Process according to claim 9, the diagram or graphical representation, or one of the graphical representations, representing the said apparatuses (105, 107, 109), the gas sources to which they are connected (90, 96) and the equipment (98, 100, 102, 104, 106, 108, 308–318) for connecting the said apparatuses to the said gas sources.

14. Process according to claim 1, comprising, when one of the gas is a mixture of a balance gas and at least a first mixed gas:
- the selection of the desired quantitative composition of gas mixed in the mixture,
- the consultation of a database (5) comprising, for each mixture, the preparation tolerances and the corresponding analysis uncertainties,
- the indication, for the desired quantitative composition, of the preparation tolerance and of the analysis uncertainty.

15. Process according to claim 14, furthermore comprising, when several quantitative compositions are selected for a same mixture:
- a calculation of a linear regression from analysis details for the different mixtures and the different quantitative compositions,
- the display of a regression line (D') corresponding to that calculation of linear regression, for a given apparatus.

16. Process according to claim 1, the database (6) consulted, or the database produced, furthermore comprising, for at least one of the apparatuses, data on the nature of a mixture with which that apparatus may be calibrated, and data on the frequency of calibration of the said apparatus.

17. Process according to claim 1, wherein, furthermore, there is displayed, on a same page (232) of a screen of a display means, and for a same apparatus, the corresponding data (236, 238, 240, 242) on the gas to be used with that apparatus.

18. Process according to claim 1, wherein, furthermore, there is displayed, on a same page (258) of a screen of a display means, and for a same gas, the total of the consumptions for that gas and all of the apparatuses supplied by that gas.

19. Process for producing an installation using apparatuses, each apparatus being supplied with gas, comprising:
- the production of a diagram or a graphical representation of the installation, using a process according to claim 1,
- the production of the installation.

20. Device for producing a diagram of an installation using apparatuses, each apparatus being supplied with gas, this device comprising:
- means (2) of storing:
- at least one database (6) comprising, for each apparatus, data on the flow rate, the nature and the purity of the gas supplying the apparatus, and the supply pressure of that gas for that apparatus,
- a database (5) comprising, for each gas and each gas purity, at least one possible packaging,
- means (30) for selecting, for each apparatus, a value or a limit value of duration or of frequency of use,
- means (22, 24) for calculating, or specially programmed for calculating, for each apparatus, the consumption, or the limit consumption, according to the data on the flow rate and the utilization value,
- means (22, 24) for calculating, or specially programmed for calculating, for each gas and each gas purity, the total of the consumptions for all the apparatuses,
- means (12, 14, 16, 31) for consulting the packaging database (5) in order to find in it, according to gas consumption data and technical constraints relating to the storage of the gas and/or to their delivery, a possible packaging.

21. Terminal device (8) for producing a diagram of a gas installation, for a laboratory or a factory comprising at least one apparatus, each apparatus being supplied with gas, this device comprising:
- means of communication (12, 14, 16, 31) for establishing communication between the said terminal device and means (2) containing at least one database (4, 5, 6, 7) comprising, for each apparatus, data on the flow rate, the nature of the purity of the gas supplying the apparatus, and the supply pressure of that gas for that apparatus, and for transferring data from the said set of databases to the said terminal,
- means (30) for supplying the said terminal with user data for the said terminal, comprising at least one item of data on a used apparatus or identifying a used apparatus,
- means of storage (24, 26), in communication with the means for supplying the said terminal with user data, for storing these user data on an apparatus used by the user, together with data supplied by the database on the flow rate, the nature and the purity of the gas supplying that apparatus, and the supply pressure of that gas for that apparatus, means (22, 24) for calculating, or specially programmed for calculating, for each apparatus, the consumption or the limit consumption, according to the flow rate of the gas, and for calculating, for each gas and each gas purity, the total of the consumptions of all of the apparatuses used, means of display (29), in communication with the means of storage, for displaying at a least a portion of these data supplied by the database, and/or the total or totals of consumption calculated for each gas.

22. Device according to claim 20, furthermore comprising means (22, 29) for graphically representing the installation comprising the said apparatuses and their gas supply means.

23. Device according to claim 22, the means of graphical representation being three-dimensional representation means.

24. Device according to claim 20, furthermore comprising, for the case where one of the gas is a mixture of a balance gas and at least a first mixed gas:

means (30, 10) for selecting the desired quantitative composition of gas mixed in the mixture, means (22, 12, 31) for, or specially programmed for, establishing communication between the said device and a database (5) comprising, for each mixture, the preparation tolerances and the corresponding analysis precisions, and for searching in that database for the preparation tolerance and the analysis precision corresponding to the desired quantitative composition, means (29) for displaying, for the desired quantitative composition, the preparation tolerance and the analysis precision.

25. Device according to claim 24, furthermore comprising, for the case where several quantitative compositions are selected for a same mixture:

means (22) for carrying out a linear regression calculation from analysis precisions for the different mixtures and the different quantitative compositions, means (29) for displaying a regression line (D') corresponding to that linear regression calculation, for a given apparatus.

26. Device according to claim 20, the database (6) comprising, for each apparatus, data on the gas supplying that apparatus, also comprising, for at least one of the apparatuses, data on the nature of the gas with which that apparatus can be calibrated, and data on the frequency of calibration of that apparatus with that gas.

27. Device according to claim 20, furthermore comprising means for, or specially programmed for, displaying, on a same page (232) of a screen of a display means (29), and for a same apparatus, the corresponding data (236, 238, 240, 242) on the gas to be used with that apparatus.

28. Device according to claim 20, furthermore comprising means for, or specially programmed for, displaying, on a same page (258) of a screen of a display means (29), and for a same gas, the total of the consumptions for that gas and all of the apparatuses supplied by that gas.

29. Device according to claim 20, the means of storing, or containing, databases being localized in an central computer (2).

30. Process according to claim 2, furthermore comprising:

a step of consultation of a database (7), comprising data on gas installation equipment, searching, in this database, for the equipment (90–100, 104, 106, 108) making it possible, for each packaging and each apparatus, to connect the said packaging to the said apparatus (105, 107, 109).

31. Process according to claim 2, furthermore comprising a step of graphical representation of the installation comprising the said apparatuses (52, 54, 56, 58, 60; 72, 74, 76, 78, 80, 82, 105, 107, 109) and the gas sources (62, 64, 66, 96, 306) to which they are connected.

32. Process according to claim 10, the graphical representation being preceded by a step of selection of a graphical representation, or of a type of graphical representation, from among several possible graphical representations or types of representation.

33. Process according to claim 10, the diagram or graphical representation, or one of the graphical representations, being three-dimensional and comprising a representation of the ductings (70) connecting the said apparatuses to the gas sources.

34. Process according to claim 10, the diagram or graphical representation, or one of the graphical representations, representing the said apparatuses (105, 107, 109), the gas sources to which they are connected (90, 96) and the equipment (98, 100, 102, 104, 106, 108, 308–318) for connecting the said apparatuses to the said gas sources.

35. Process according to claim 2, comprising, when one of the gas is a mixture of a balance gas and at least a first mixed gas:

the selection of the desired quantitative composition of gas mixed in the mixture, the consultation of a database (5) comprising, for each mixture, the preparation tolerances and the corresponding analysis uncertainties, the indication, for the desired quantitative composition, of the preparation tolerance and of the analysis uncertainty.

36. Process according to claim 2, the database (6) consulted, or the database produced, furthermore comprising, for at least one of the apparatuses, data on the nature of a mixture with which that apparatus may be calibrated, and data on the frequency of calibration of the said apparatus.

37. Process according to claim 2, wherein, furthermore, there is displayed, on a same page (232) of a screen of a display means, and for a same apparatus, the corresponding data (236, 238, 240, 242) on the gas to be used with that apparatus.

38. Process according to claim 2, wherein, furthermore, there is displayed, on a same page (258) of a screen of a display means, and for a same gas, the total of the consumptions for that gas and all of the apparatuses supplied by that gas.

39. Device according to claim 21, furthermore comprising means (22, 29) for graphically representing the installation comprising the said apparatuses and their gas supply means.

40. Device according to claim 21, furthermore comprising, for the case where one of the gas is a mixture of a balance gas and at least a first mixed gas:

means (30, 10) for selecting the desired quantitative composition of gas mixed in the mixture, means (22, 12, 31) for, or specially programmed for, establishing communication between the said device and a database (5) comprising, for each mixture, the preparation tolerances and the corresponding analysis precisions, and for searching in that database for the preparation tolerance and the analysis precision corresponding to the desired quantitative composition, means (29) for displaying, for the desired quantitative composition, the preparation tolerance and the analysis precision.

41. Previously presented) Device according to claim 21, the database (6) comprising, for each apparatus, data on the gas supplying that apparatus, also comprising, for at least one of the apparatuses, data on the nature of the gas with which that apparatus can be calibrated, and data on the frequency of calibration of that apparatus with that gas.

42. Device according to claim 21, furthermore comprising means for, or specially programmed for, displaying, on a same page (232) of a screen of a display means (29), and for a same apparatus, the corresponding data (236, 238, 240, 242) on the gas to be used with that apparatus.

43. Device according to claim 21, furthermore comprising means for, or specially programmed for, displaying, on a same page (258) of a screen of a display means (29), and for a same gas, the total of the consumptions for that gas and all of the apparatuses supplied by that gas.

44. Device according to claim 21, the means of storing, or containing, databases being localised in a central computer (2).

45. Computer program product, comprising computer executable instructions which, when executed by a computer, implement a process for producing a diagram of an installation using apparatuses, each apparatus being supplied with gas, by performing the steps of:

the consultation of one or more databases (6) comprising, for each apparatus, data on the flow rate, the nature, the purity of the gas supplying the apparatus, and the supply pressure of that gas for that apparatus;

the selection, for each apparatus, of a value or of a limit value of duration or frequency of use;

the calculation, for each apparatus, of the consumption, or of the limit consumption, according to the utilization value and to the flow rate data;

the calculation, for each gas and for each gas purity, of the total of the consumptions of all of the apparatuses; and the consultation of a database (5) for proposing, for each gas and each gas purity, a packaging, according the consumptions and the technical constraints relating to the storage of the gas and/or to their delivery.

46. Computer-readable medium encoded with computer executable instructions, which, when executed by a computer, produce a diagram of an installation using apparatuses, each apparatus being supplied with gas, wherein the instructions are provided for:

consulting one or more databases (6) comprising, for each apparatus, data on the flow rate, the nature, the purity of the gas supplying the apparatus, and the supply pressure of that gas for that apparatus;

selecting, for each apparatus, a value or of a limit value of duration or frequency of use;

calculating, for each apparatus, the consumption, or the limit consumption, according to the utilization value and to the flow rate data;

calculating, for each gas and for each gas purity, the total of the consumptions of all of the apparatuses; and consulting a database (5) for proposing, for each gas and each gas purity, a packaging, according the consumptions and the technical constraints relating to the storage of the gas and/or to their delivery.

47. Computer program product, comprising computer executable instructions which, when executed by a computer, implement a process for producing a database comprising a set of data for the constitution of an installation using apparatuses, each apparatus being supplied with gas, wherein the database includes:

for each apparatus, data on the nature and the purity of the gas for that apparatus, together with the flow rate, the supply pressure and the consumption of each gas for that apparatus;

the total of the consumptions of all the apparatuses, for each gas and each gas purity; and data relating to a packaging, for each gas and each gas purity, as a function of the consumptions of the apparatuses.

48. Computer-readable medium encoded with computer executable instructions, which, when executed by a computer, produce a database comprising a set of data for the constitution of an installation using apparatuses, each apparatus being supplied with gas, wherein the database includes:

for each apparatus, data on the nature and the purity of the gas for that apparatus, together with the flow rate, the supply pressure and the consumption of each gas for that apparatus;

the total of the consumptions of all the apparatuses, for each gas and each gas purity; and data relating to a packaging, for each gas and each gas purity, as a function of the consumptions of the apparatuses.

* * * * *